United States Patent [19]
Davis

[11] Patent Number: 5,106,499
[45] Date of Patent: * Apr. 21, 1992

[54] APPARATUS FOR SHIFTING FILTER PLATES IN A FILTER PRESS

[75] Inventor: Steven S. Davis, Farmington, Utah

[73] Assignee: Envirotech Corporation, Menlo Park, Calif.

[*] Notice: The portion of the term of this patent subsequent to Feb. 21, 2006 has been disclaimed.

[21] Appl. No.: 494,224

[22] Filed: Mar. 15, 1990

Related U.S. Application Data

[63] Continuation-in-part of Ser. No. 312,910, Feb. 21, 1989, Pat. No. 5,006,241, which is a continuation of Ser. No. 936,091, Nov. 28, 1986, Pat. No. 4,806,239.

[51] Int. Cl.$^5$ ............................................. B01D 25/172
[52] U.S. Cl. .................................... 210/225; 210/230; 210/231
[58] Field of Search ................ 210/224, 225, 227, 230, 210/231; 100/198, 199, 211

[56] References Cited

U.S. PATENT DOCUMENTS

| | | | |
|---|---|---|---|
| 3,232,435 | 2/1966 | Fismer | 210/230 |
| 3,347,383 | 10/1967 | Augerot | 210/225 |
| 3,633,747 | 1/1972 | Fismer | 210/739 |
| 3,637,082 | 1/1972 | Bentzian | 210/225 |
| 3,820,446 | 6/1974 | Grambom et al. | 92/88 |
| 3,826,374 | 7/1974 | Busse | 210/225 |
| 3,915,863 | 10/1975 | Busse et al. | 210/230 |
| 4,102,788 | 7/1978 | Broad | 210/230 |
| 4,105,560 | 8/1978 | Fismer | 210/230 |
| 4,132,647 | 1/1979 | Sakuma | 210/230 |
| 4,172,792 | 10/1979 | Heinrich et al. | 210/230 |
| 4,172,793 | 10/1979 | Oelbermann et al. | 210/230 |
| 4,272,376 | 6/1981 | Schotten | 210/230 |
| 4,359,385 | 11/1982 | Krivec | 210/230 |
| 4,362,616 | 12/1982 | Gehrman | 210/225 |
| 4,364,827 | 12/1982 | Guttman | 210/225 |
| 4,597,862 | 7/1986 | Davis | 210/106 |
| 4,623,453 | 11/1986 | Davenport | 210/143 |
| 4,963,255 | 10/1990 | DeHaan et al. | 100/199 |

FOREIGN PATENT DOCUMENTS

| | | |
|---|---|---|
| 1812901 | 8/1970 | Fed. Rep. of Germany . |
| 2026192 | 9/1970 | France . |
| 457640 | 3/1970 | Japan . |
| 458314 | 3/1970 | Japan . |
| 2101003 | 1/1983 | United Kingdom . |

OTHER PUBLICATIONS

Brochure "Origa" published by Origa Corp. of Elmhurst, Ill.—date unknown.
Brochure "Tack Cable Cylinders" published by Tol-O-Matic, Inc. of Minneapolis, Minn.—copyright 1984.
Brochure "Festo Pneumatic" published by Festo Corp. of Hauppauge, N.Y.
Brochure "Tran-Sair System" published by Mosier Industries, Inc. of Brookville, Ohio—copyright 1986.
Brochure "Lintra ® Rodless Cylinders" published by Norgren Martonair of Littleton, Colo.—copyright 1986.

Primary Examiner—W. Gary Jones
Assistant Examiner—Matthew O. Savage
Attorney, Agent, or Firm—Trask, Britt & Rossa

[57] ABSTRACT

An apparatus for effecting the separation of filter plates within a filter press is disclosed. The apparatus includes a guide track having mounted thereon a slidably reciprocal carriage. The carriage includes at least one pivoted pawl having an abutment space defined thereon for contacting a filter plate to be transported. The pawl is held in a raised orientation by a resilient spring means. The carriage is driven along the guide track by means of a pressure displaced piston mechanically associated therewith. The piston is housed within a tubular member. Positioned within the tubular member are two pressure chambers, one on each end of the piston. Pressurized fluid is controlledly introduced into one or the other of those chambers to effect a displacement of the piston. The pressure cylinder is of the type generally designated a rodless cylinder.

15 Claims, 13 Drawing Sheets

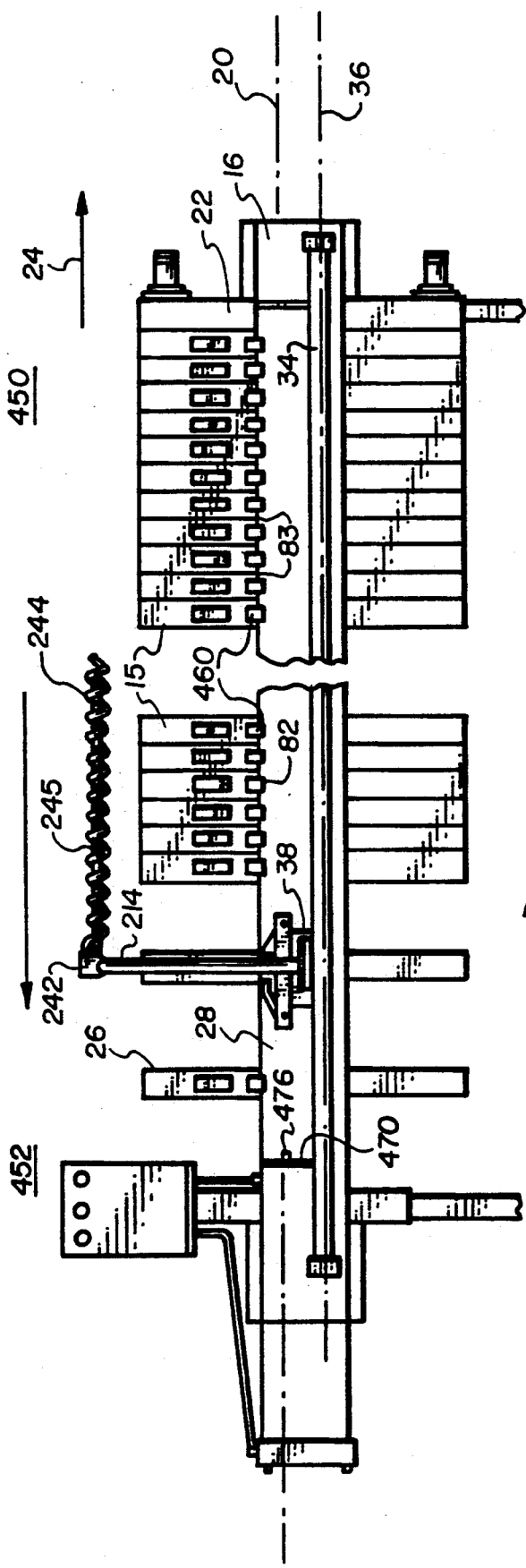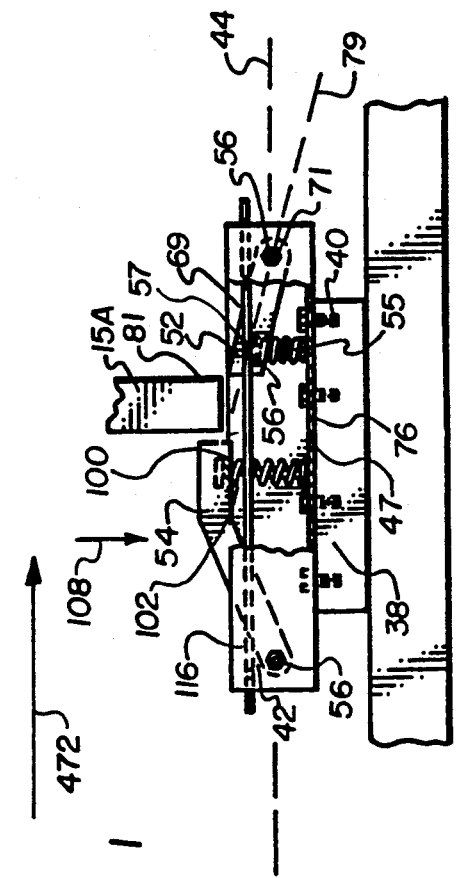

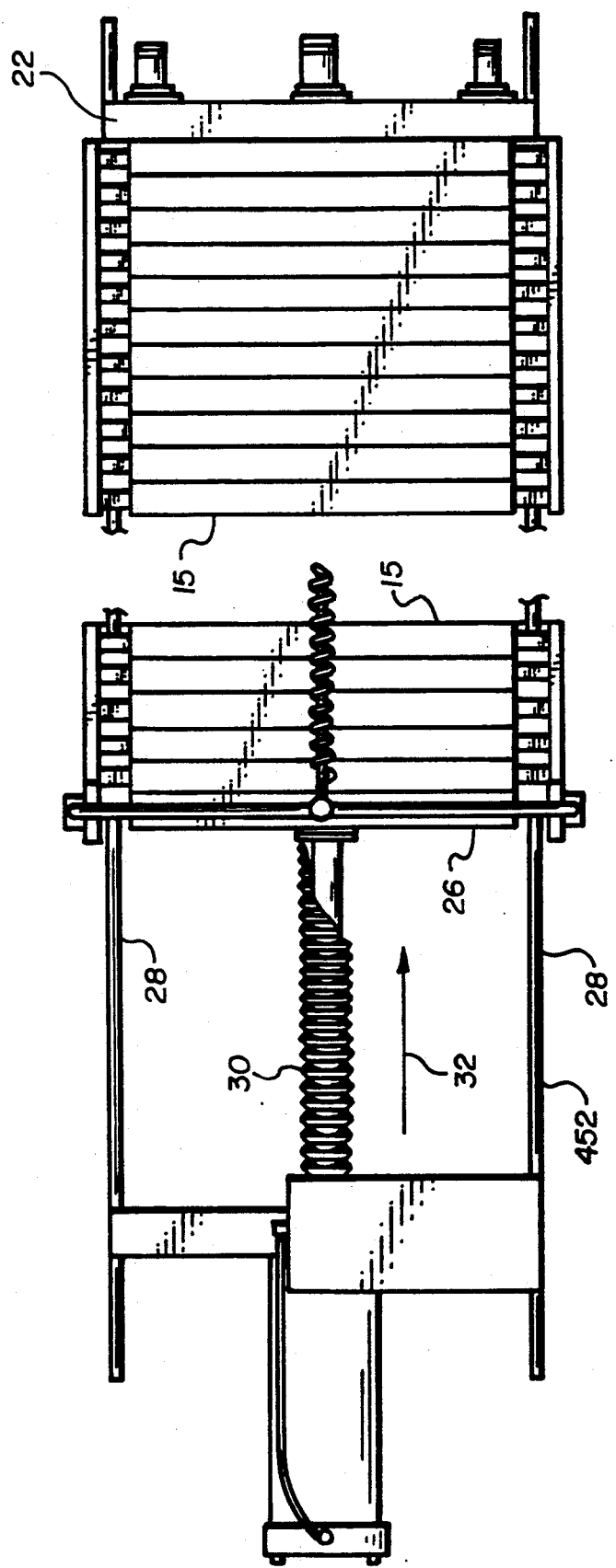

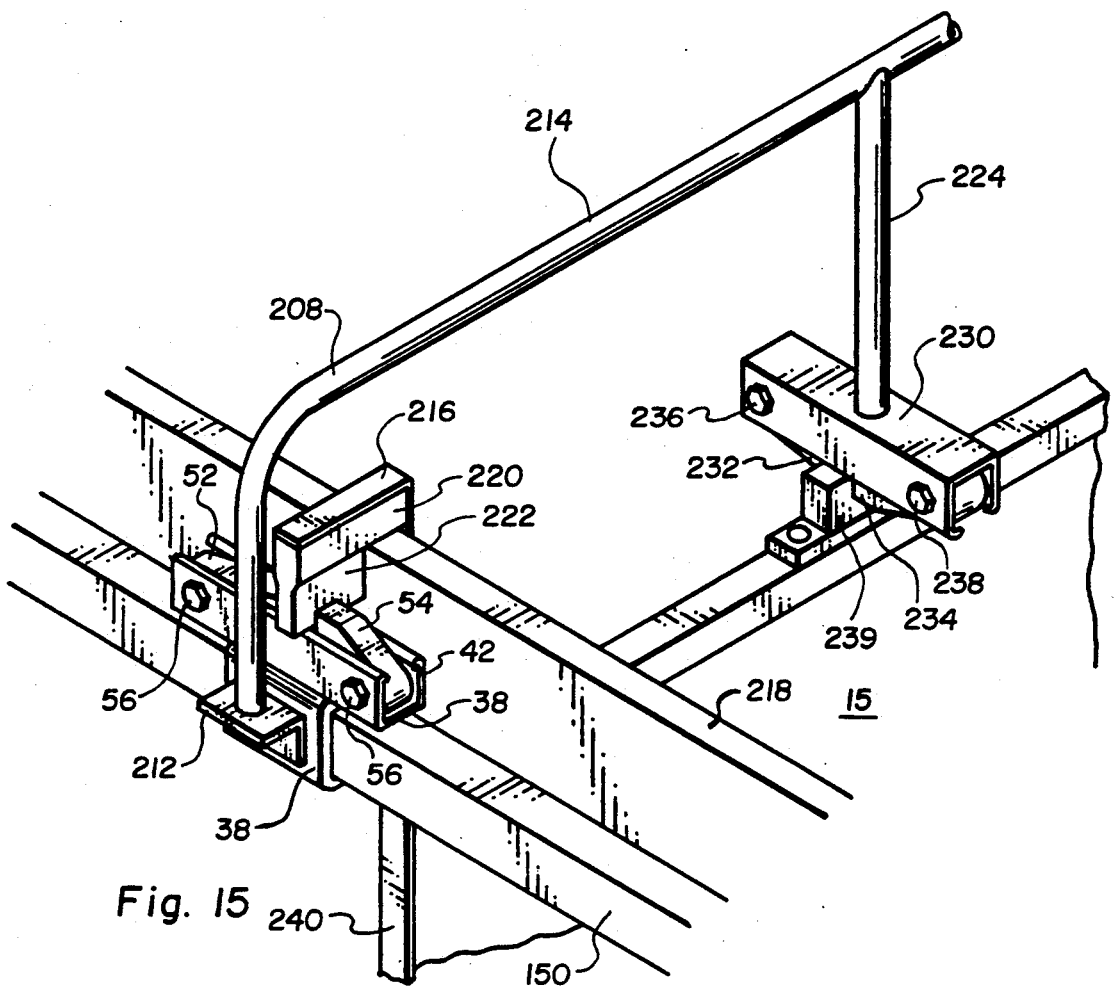
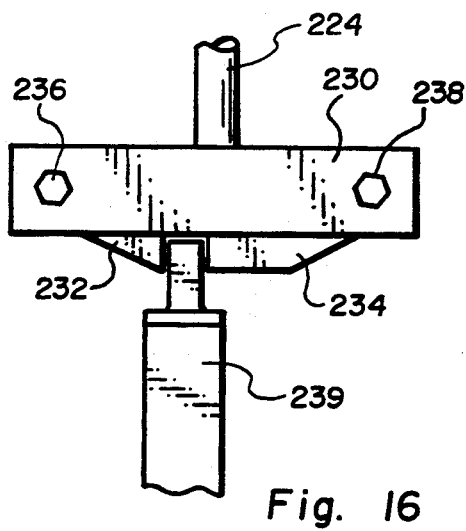

APPARATUS FOR SHIFTING FILTER PLATES IN A FILTER PRESS

RELATED APPLICATIONS

This application is a continuation-in-part of U.S. patent application Ser. No. 312,910, filed Feb. 21, 1989, now U.S. Pat. No. 5,006,241 which is a continuation of U.S. patent application Ser. No. 936,091, filed Nov. 28, 1986 now U.S. Pat. No. 4,806,239.

BACKGROUND OF THE INVENTION

1. Field

This invention relates to filter presses, specifically presses having a plurality of filter plates adapted for removing or separating solids from liquids. More particularly, this invention is directed to apparatus for separating the filter plates within such a filter press.

2. Statement of the Art

The type of apparatus, known generally as a filter press, is well known in the art. These apparatus are used in various industries to separate solids from liquids. Filter presses may be used to separate solids from suspensions, slurries, and similar aqueous feed streams. Filter presses find application in a variety of industries, e.g. sewage treatment and mining operations.

A filter press generally includes a plurality of separable plates. These plates are slidably held on a frame structure between a fixed support and an opposing moveable support. This moveable support is actuated typically by a hydraulic ram.

The plates are typically arranged in parallel about a horizontal axis. Each plate includes a depression on its side surface Positioned over that depression is a filter cloth or fabric Upon the plates being positioned adjacent one another, the opposing depressions in adjacent plates form a cavity wherein the filter cloth is suspended. In order to effect filtering, the plates are compressed one against another by a horizontally mounted hydraulic ram. The compression of the plates, one against another, serves to form a sealed abutment of each plate against its neighboring plates. Thereafter, the fluid or solution, to be processed, may be injected into the plates and through the various cavities defined by the adjacent filter plates. Since the feed stream is fed under pressure into the enclosed cavities, the pressure of the feed stream forces the liquid through the filter cloths. The solids within the stream are embedded on the filter cloths as the liquid passes through the cloths.

When the filtering operation is complete, the hydraulic ram is retracted.

As the filtering plates filter the aqueous feed stream, an increasing quantity of solid material is built up upon the surface of the filter cloths. After reaching a certain quantity, these solid deposits or cakes preclude operation or further use of the filter. In order to continue use of the filter press, the filter plates must be separated one from another and the cakes or solid deposits removed from the filter cloths.

The means and method of separating the filter plates one from another to facilitate the cleaning of the filter cloths is a problem which has confronted the industry for many years. The most rudimentary approach to separating these cloths involves the manual efforts of two or more men using crowbars or other type of wedges to separate one plate from its neighboring plate. Since the plates are forced against one another by a hydraulic ram and further, since various deposits within the filter press itself serve to coalesce and thereby bond one plate to another, the amount of force which must be applied to a filter plate to effect its separation from a neighboring plate may be considerable. Furthermore, the use of human labor in this type of environment involves a considerable amount of safety risk and cost.

As a result, various attempts have been made in the past to devise automated separation systems for use in separating the plates in the filter press after filtration has been effected. Representative of some of these attempts are those which are described in Broad U.S. Pat. No. 4,102,788, Krivec U.S. Pat. No. 4,359,385, Busse, et al. U.S. Pat. No. 3,915,863, Fismer U.S. Pat. No. 3,232,435, Schotten U.S. Pat. No. 4,272,376, Sakuma U.S. Pat. No. 4,132,647 and U.S. Pat. No. Fismer 4,105,560.

SUMMARY OF THE INVENTION

The instant invention is directed principally for use in a filter press having an elongated frame and a plurality of filter plates mounted to be slidable along that frame, i.e. along the longitudinal axis of the frame. The plates are positioned between a stationary support and a moveable plate which is displaced by a hydraulic ram or other driving means.

The automatic filter plate shifter of the invention includes a guide track which is positioned proximate the filter plates. The guide track is oriented to be substantially parallel to the longitudinal path of the filter plates within the press. Slidably mounted on that guide track is a carriage which is adapted to reciprocate on the track, thereby moving along that track in both a forward and backward direction, i.e. along substantially its full length. The carriage includes at least one first pawl, which is positionable on that carriage in two orientations or conditions. In its first orientation or condition, the pawl is raised above the surface of the carriage. In its second orientation, the pawl is positioned substantially lower than its first orientation. The pawl may, in some instances, actually be positioned below the uppermost surface of the carriage itself. The pawl is pivotally mounted to the carriage so as to be reciprocal between the first and second orientation. A resilient support means which is mounted on the carriage and associated with the first pawl continuously urges that pawl into its first, i.e. raised, orientation.

The first pawl includes an abutment surface which is configured upon the first pawl reaching its raised orientation, to firmly contact a filter plate. As the carriage is displaced in a first direction, the abutment surface transfers the momentum of the carriage against the filter plate thereby pushing against the filter plate and effecting a corresponding displacement of that plate. In preferred constructions, the first pawl also includes a sliding surface. The sliding surface is typically a planar surface positioned in an angulated orientation. This sliding surface is adapted to contact slidingly the filter plates as the carriage is displaced in a second direction. As the sliding surface contacts a filter plate, the contact shifts the first pawl from its raised condition to its lowered condition. In this lowered condition the abutment surface is substantially held out of contact with the filter plate The sliding surface permits the first pawl to be shifted to its lowered condition and thereafter displaced in a second direction beyond a filter plate or plate(s) mounted adjacent to the pawl's track. Once past the plates, the first pawl is returned to its raised orientation. The direction of the first pawl's travel may then be reversed, i.e. to the first direction bringing the abutment surface into contact with the filter plate. A further displacement of the carriage/pawl assembly effects a displacement of the filter plate in the direction of movement of the carriage pawl assembly, i.e. the first direction.

In some embodiments, a second pawl, as distinguished from the heretofore described first pawl, is pivotally mounted on the carriage and is positioned substantially opposite the mounting of the first pawl. Similar to the first pawl, the second pawl is mounted to be positionable in two orientations or conditions. In its first orientation the second pawl is positioned in a raised orientation to extend beyond the uppermost surface of the carriage. In its second, or lowered orientation, the pawl is positioned below the height or altitude of its raised orientation and may in some instances be actually positioned below the uppermost surface of the carriage. The second pawl also includes an abutment face and an angulated sliding surface. The second pawl's abutment face may be positioned opposite the abutment face of the first pawl. The angulated sliding surface of the second pawl may be positioned substantially at angle of 90° from that of the first pawl.

In preferred constructions, the pivot mountings of both the first and the second pawl permit the rotation of each pawl about an axis which is substantially horizontal. Further, that rotational axis may also be oriented to be substantially perpendicular to the longitudinal axis of the filter press frame. In some constructions, the pawls rotate in a vertical plane which is parallel to the longitudinal axis of the carriage and the longitudinal axis of the frame, as well as parallel to the direction of travel of the carriage along the guide track. Similar to the first pawl, the second pawl also includes a resilient support means associated therewith which is adapted to urge the second pawl continuously into its first or raised orientation.

A restraining means may be associated with the carriage and is adapted for interaction with the first pawl. The restraining means is adapted to shift the first pawl into its lower orientation and hold it in that particular orientation. While the restraining means retains the first pawl in its lower orientation, the second pawl continues to be urged upward, by its resilient support means, into its raised orientation. The action of the restraining means provides a means whereby the carriage may be directed to pass along the guide track in the first direction while avoiding any substantial displacement-limiting contact between the pawls and the filter plates. This passage is important since the relative positioning of the carriage vis-a-vis the filter plates must be transposed when the opening of the entire collection of filter plates has been accomplished. Stated otherwise, the carriage operates to shift each plate from a closed configuration on one fixed end of the press frame to an open configuration on the moveable opposing end of the same frame. When the last plate has been shifted to the moveable opposing end, the carriage is positioned between the open plates and the fixed end. To repeat the filtering operation, the plates must be displaced to the fixed end and reassembled in their closed configuration. In accomplishing this displacement, the plates typically must pass by the carriage or alternately the carriage must pass by the plates. The restraining means facilitates this passage by arranging the pawls to slide past the plates without effecting any solid abutment-type contact of the pawls against the plates.

In a preferred construction this restraining means includes a pair of parallelly oriented shaft-like members which are slidably mounted within channels defined by the structure of the carriage. The shaft members are slidable along the longitudinal axis of the carriage. The carriage longitudinal axis is parallel to the longitudinal axis of the frame. Positioned between each of the two parallel and spacedly mounted shaft members are two cross-members which extend from one shaft member to the other shaft member. These cross-members are generally aligned to be perpendicular to the longitudinal axis of the carriage. The assembly of the shaft members with their attendant cross-members is made slidable longitudinally within the carriage. As the shaft/cross-member assembly slides, one of the cross-members is brought into abutment against the upper surface of the first pawl, and thereby serves to restrain or depress that pawl into its lowered orientation.

The carriage is mechanically associated with a drive means. Preferably this drive means is a piston, which piston is reciprocally mounted within a tubular member. The tubular member is associated with the frame of the filter press. The tubular member includes a sidewall which extends longitudinally along the length of the filter press frame. The tubular member defines two oppositely-positioned pressure chambers within the hollow interior of that tubular member. The piston is positioned between those pressure chambers As the pressure is varied within those two pressure chambers the piston is displaced within the tubular member, the displacement or reciprocation of the piston effects a corresponding displacement of the carriage along the guide track.

In one embodiment, the tubular member defines a slot-like aperture which extends along its length. A bracket mounting of the piston to the carriage member is slidably fitted into the slot. The tubular member is fitted with a means of successively sealing the slot during the movement of the piston within the tubular member. This sealing permits the pressurization of the two opposing pressure chambers. This pressurization effects the displacement of the piston within the tubular member.

In another construction, the opposing ends of the piston are each fixedly mounted to an end of a belt-like member. This member extends from its end mounting through the length of a respective pressure chamber and exits that chamber and the tubular member through an otherwise sealed port. The belt in association with the piston forms an endless belt member. The carriage is mounted to this belt-like member on a region thereof external to the tubular housing. As the piston is displaced, the belt is correspondingly displaced. Resultingly, the carriage is likewise displaced.

A further construction involves the use of a magnetic association of the carriage with the piston. In this embodiment, the tubular housing is constructed of non-magnetic material, the piston is fabricated of magnetic material. A collar of ferrous material is slidably mounted on the exterior of the tubular housing and made reciprocable along the surface of that housing. The carriage is fixedly mounted to that collar. As the piston reciprocates within the housing, the momentum of its movement is translated to the collar/carriage assembly by means of the magnetic relationship between the collar and the piston.

The introduction of pressurized fluid into either of the pressure chambers, defined within the tubular member, is manipulated by a control system. This control system operates to channel pressurized fluid to effect a displacement of the carriage in a second direction until a pawl on the carriage is brought into an abutting orientation against the surface of a filter plate.

In those constructions utilizing a two-pawl arrangement, once the abutment surface of the second pawl is brought into an abutment against the filter plate the abutment results in an introduction of the filter plate into the space between the two opposing pawls. The filter plate is abutted against the abutment surface of the second pawl on one side and against the abutment surface of the first pawl on an opposing side. Since the filter plate is adjacent a neighboring series of plates, which themselves are abutted against a firmly positioned support, the continued channeling of pressurized fluid to the pressure chamber serves to augment the pressure within that chamber, without any corresponding displacement of the filter plate. As the pressure within the pressure chamber builds and surpasses a preselected value, the control system introduces pressurized fluid into the second or opposing pressure chamber within the tubular member. The pressurized fluid in the former or first pressure chamber is vented. The introduction of pressurized fluid into the second pressure chamber effects a displacement of the carriage in a first direction which is opposite to that effected by the pressurization of the first pressure chamber.

The arrangement of the pawls effects a releasable union of the pawls with the filter plate upon the abutment of those pawls with the filter plate.

The carriage, through means of the piston, is driven by a sufficient force to displace the filter plate along a first direction opposite to that direction obtained by pressurized fluid being channeled into the first pressure chamber.

The filter plate is transported to the movable end of the frame. Upon the plate impacting against an end plate mounted thereon or against filter plates abutted against that plate, the filter plate is precluded from further displacement in the first direction. Further, the second pawl upon contacting the cylinder plate or a previously transported filter plate, abutting against the cylinder plate, is shifted to its second or lowered orientation. In this lowered orientation, the abutment surface of the second pawl does not abut against the filter plate.

Due to the filter plates being unable to be further displaced, the fluid pressure in the second cylinder increases until reaching a preselected level. On reaching that pressure level, the second chamber is vented while pressurized fluid is introduced into the first chamber effecting a displacement of the carriage in the second direction.

The above operation is repeated successively for each filter plate until the entire plurality of filter plates is transferred from their loaded or compressed condition to their open configuration on the opposing end of the filter press frame.

The filter press is fitted with two stops which are positioned proximate the guide track. A first stop is fitted proximate the fixed head plate. A second stop is fitted proximate the location of the moveable support or follower, when that support is in its withdrawn orientation or configuration, i.e., when the hydraulic ram has been withdrawn to permit the opening of the compressed filter plates.

As the carriage proceeds along the guide track in a second direction after having transferred all of the filter plates from their closed orientation to their open orientation, the carriage impacts against the first stop positioned proximate the fixed head plate. As the carriage abuts against the first stop, the restraining means is actuated. In preferred embodiments, the two shaft-like members which extend from the carriage are driven slidably and longitudinally along the carriage. The displacement of the shaft-like members effects a corresponding displacement of the cross-members mounted thereon. One of the cross-members is thereby brought into abutment against the first pawl member. As the shaft members are driven further along the structure of the carriage, the cross-member is driven over the sliding surface of the first pawl, thereby depressing that first pawl into its lowered orientation. Once the carriage is unable to proceed further along the guide track in the second direction, as a result of the first stop, the pressure within the tubular member reaches the critical value. Thereafter pressurized fluid is introduced into the opposing pressure chamber or second chamber, effecting a displacement of the carriage member in the first, i.e., opposite direction to a position proximate the second stop. Due to the lowered orientation of the first pawl, the carriage passes unimpeded past the filter plates to a starting position proximate the moveable follower. The second stop may be fitted with a deactivation button. Upon the carriage being brought into abutment against that second stop, the pressure sensitive disengagement button disengages the entire filter press shifting apparatus system.

Prior to a disengagement being effected, the shaft members of the restraining means, which have been previously driven longitudinally and slidably along the length of the carriage by their impact against the first stop, impact against the second stop. This impact effects a displacement of the cross-members to a position wherein the first pawl is released from its lowered position.

The guide tracks of the invention may be positioned adjacent to the filter plates, i.e., along the sides of the filter plates, to extend substantially parallel along the longitudinal axis of the filter press. The tracks may be positioned above the stacked array of filter plates while at the same time extending substantially parallel to the longitudinal axis of the filter press. In preferred constructions a guide track, together with its associated carriage and drive means, is positioned on each side of the filter plate so as to form a joint transport means to convey the plates from one location to the other.

In those embodiments which utilize pressurized air in the drive means, the pressurized air may also be utilized to effect a pressurized or mechanical discharge of the filter cakes from the filter cloths suspended between each pair of adjoining filter plates. In a preferred construction, the first pawl may be fitted with a conduit therein with a connected nozzle fitted on the first pawl's abutment surface. The conduit and nozzle are adapted to receive a supply of pressurized air from an external source and direct that flow into the structure of a filter plate being transferred.

In this construction, the filter plate is also fitted with a conduit which connects to a port adapted to receive the nozzle of the first pawl. The conduit is adapted to channel the flow of air to a location between the surface of the filter plate and the interior or back surface of the filter cloth suspended over that filter plate. Pressurized air may be directed from an external source through the first pawl and into the very structure of the filter plate while it is being transferred from one location to another. The pressurized air directed between the filter plate's exterior surface and the back surface of the filter cloth effects a balloon-like configuration in which the filter cloth is spatially removed from the surface of the filter plate and bowed convexly outward. This bowing action serves to disrupt the cake formations on the exterior surface of the filter cloth, thereby aiding and contributing to the discharge of those filter cakes from the surface of the filter cloth.

In those constructions of the filter press wherein a pair of rodless cylinders are used, the cylinders are positioned parallel and spacedly apart from one another on opposing sides of the frame. Each of the pistons of the two rodless cylinders are connected to their respective carriages. In constructions utilizing a single rodless cylinder, a uniform or constant velocity displacement of the carriage along the length of the rodless cylinders is not of particular importance. Should the progress of the carriage be temporarily impeded by the buildup of sludge or waste on the track, the pressure within the cylinder increases until it reaches a level sufficient to apply a force to the carriage adequate to overcome the resistance created by the sludge or waste. In contrast, in filter press constructions which utilize a pair of rodless cylinders, it became important that both of the carriages proceed along their respective rodless cylinders at a uniform rate or velocity. If the uniform velocity is not maintained, one of the carriages tends to advance ahead of the other, causing the filter plate to be rotated about a vertical axis. This rotation may cause the plate to be biased against the frame sufficiently that its forward progress is arrested. Further, the plate's rotation may actually cause the plate to remove itself from the frame. The present invention provides a means of maintaining the velocities of the two carriages uniform. The filter plate is thereby displaced by those carriages longitudinally along the frame avoiding any angular rotation of the plate about a vertical axis.

The two carriages are fitted with a synchronizing means which is mounted to each carriage and extends therebetween. The synchronizing means holds the two carriages in a fixed spatial relationship to one another as the carriages are displaced along the press frame. Should one carriage encounter a hindrance to its displacement, and be slowed or stopped thereby, the synchronizing means functions to slow or stop the second carriage such that it does not advance ahead of the first carriage along the press frame. Not only does the synchronizing means control the progress of the two carriages along the frame, it may also operate as a means of transferring force from one carriage to the other. Hence, the non-obstructed carriage may actually apply a force to the impeded carriage to assist in dislodging that impeded carriage.

The invention may also include a stabilizing means adapted to preclude an angular or rocking of a filter plate being transported about a longitudinal axis. In those filter press constructions wherein the connection means engages the filter plates along their upstanding sides, as the connection means applies a force to the plate directed longitudinally along the length of the filter plate frame, many of the plates tend to rotate or rock about a laterally extending longitudinal axis. Observably, this rotation impedes the displacement of the plate along the frame as the rocking tends to impede a constant engagement of the plate against the connection means. The stabilizing means of the invention may include a stabilizing means mounted either on the press frame or on the connection means. The stabilizing means includes a support frame, and an engagement means adapted to engage and form a releasable union with the filter plate at a location on the plate which is not collinear with the points of engagement of the two connection means. Hence, the plate is supported by a three-point engagement wherein at most only two of the points are collinear. In preferred constructions, the engagement means engages and forms a releasable union with the laterally extending top edge of the filter plate, preferably at a location substantially vertically above the center of gravity of the plate.

The filter press may also be fitted with a means of introducing pressured air into a plurality of channels or ducts defined within the structure of the filter plate. The air introduction means is adapted for introducing the air to a port positioned on the top of the plate preferably at a location vertically above the plate's center of gravity. The pressurized air is utilized to urge the filter cloths outward away from the surface of the plate frame, thereby breaking up the cake concentrations adhering to the cloths.

BRIEF DESCRIPTION OF THE DRAWINGS

FIG. 1 is a side view of a filter press of the instant invention illustrating the displacement of a carriage, in association with a filter plate, along a guide track;

FIG. 2 is a top view of a filter press showing the filter plate closing action of a hydraulic ram-fitted follower against an array of filter plates;

FIG. 3 is a side view of a carriage of the instant invention;

FIG. 15 is a partial perspective view of a synchronizing means of the invention shown fitted with a stabilizing means;

FIG. 16 is a partial side view of an engagement means of a stabilizing means;

DETAILED DESCRIPTION OF THE ILLUSTRATED EMBODIMENT

Figure 4:
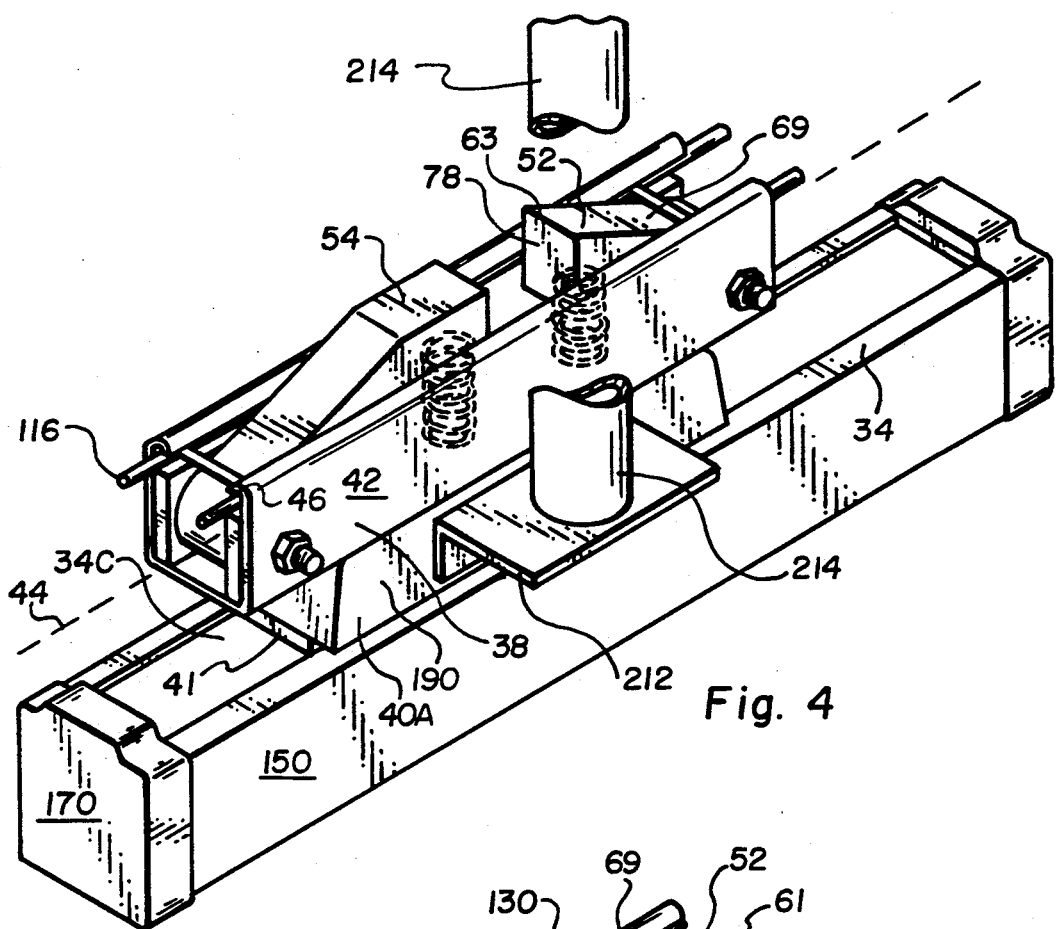
FIG. 4 is an elevated perspective view of the carriage shown in FIG. 3 illustrating a first pawl in a first or raised orientation.

As shown in FIG. 1, a filter press of the type to which the instant invention may be fitted, includes a plurality of filter plates 15 arranged along a generally elongate frame 16. The filter plates 15 are made slidable along the length of the frame 16 in a direction substantially parallel to the longitudinal axis 20 of that frame 16. The plates 15 are held in position by a fixed head plate or support 22 which extends upright and forms a barrier precluding further displacement of the plates 15 along the direction indicated by arrow 24.

A moveable follower 26 is positioned substantially opposite the plate 22 on the frame 16. The follower 26, as shown in FIG. 2, is made moveable along the tracks 28 of the frame 16 by the action of a hydraulic ram 30. As shown, the ram 30 is extended in the direction shown by arrow 32, thereby impacting against the moveable follower 26. Follower 26 impacts against the assemblage of filter plates 15 eventually pushing or compressing those plates against the head plate 22. As shown in FIG. 2, the compression of the various plates 15 into an assembly forms a compacted filter press array which is held together in a sealed relationship by the pushing action of ram 30. This sealed array facilitates an introduction of solids ladened liquids into that filter plate assemblage for purposes of filtering the solids from the liquids.

Fitted along the side of the frame 16 is a guide track 34 which is a generally elongate member having a longitudinal axis 36. Axis 36 is positioned substantially parallel to axis 20 of frame 16.

Figure 5:
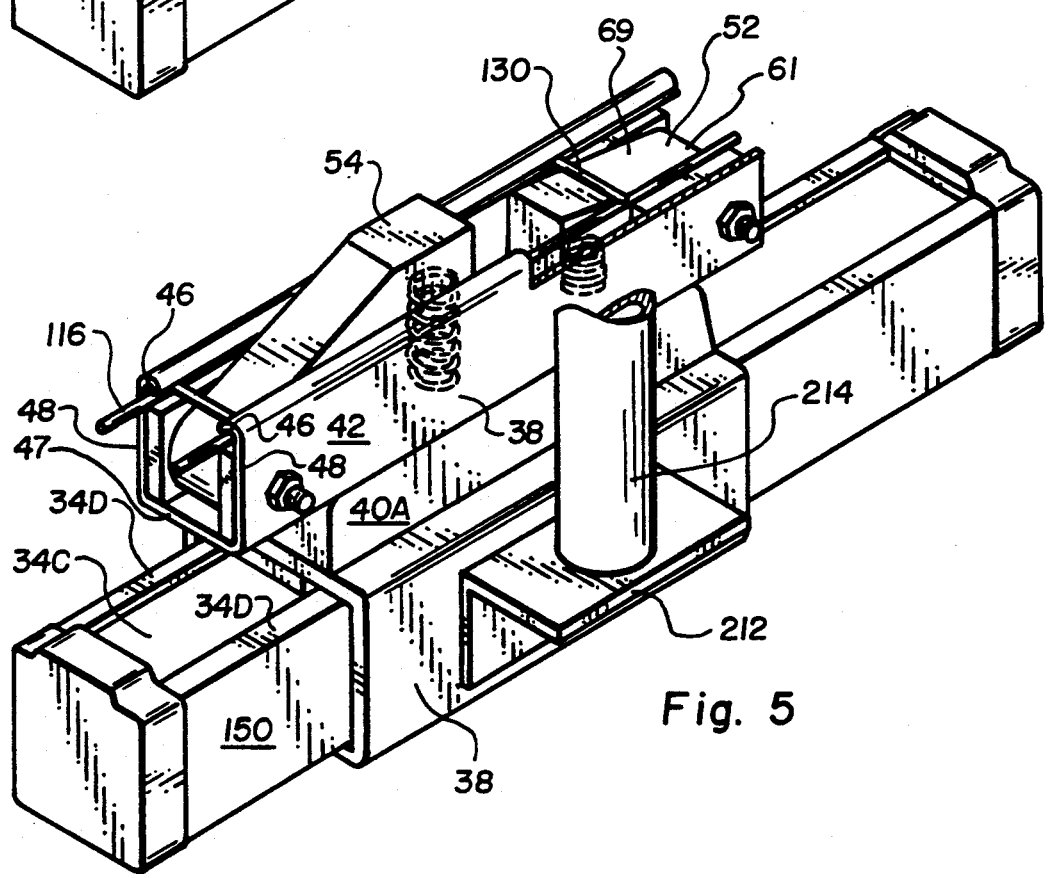
FIG. 5 is an elevated perspective view of the carriage shown in FIG. 3 illustrating a first pawl in a second or lowered orientation.
Figure 10:
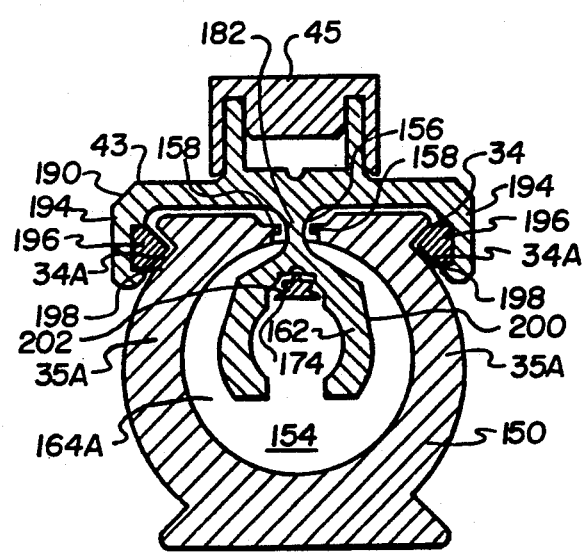
FIG. 10 is an end view of the pressure cylinder shown in FIG. 9.

Various configurations of guide track 34 are within contemplation. As shown in FIG. 10, the guide track 34 may be a pair of elongate "V" cross sectioned channels 34A which extend along opposite faces of a rigid structural member 35A. An alternate construction is shown in FIGS. 4 and 5 wherein the guide track 34 includes an elongate recess well 34C positioned between two elongate extensions 34D. Extensions 34D are oriented spacedly from one another and parallel to the longitudinal axis 36.

Mounted on the track 34 in a sliding relationship thereto is a carriage 38. As shown in FIGS. 3 through 8, the carriage 38 includes a bracket attachment means 40 which slidably connects the carriage 38 to the guide track 34. The bracket member 40A construction, shown in FIGS. 5 through 8, is an elongate block-like structure having a generally quadrilateral cross section. The bracket 40A includes an elongate lip 41, which extends into recess well 34C and provides a means to stabilize the carriage on the guide track 34. The width of lip 41 is sized to be slightly smaller than the distance separating the extensions 34D.

Figure 9:
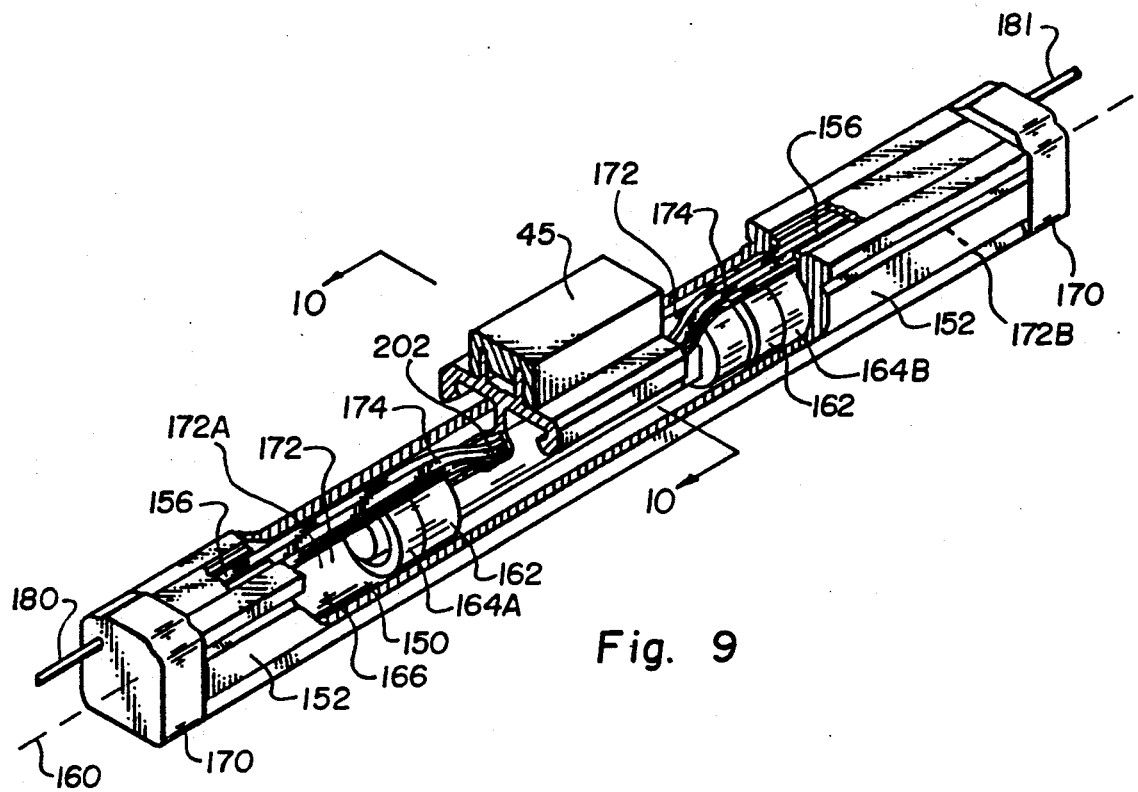
FIG. 9 is an elevated perspective view of the pressurized, rodless cylinder drive means of the instant invention.

In an alternate bracket 40B construction, as shown in FIGS. 9 and 10, the bracket may include an elongate "U"-shaped structure 43 surmounted by an elongate, generally block-like, platform 45.

As shown in FIGS. 4 through 8, the carriage 38 is a generally elongate body which extends along a longitudinal axis 44. The carriage structure 38 includes a flat planar base 47 surmounted with two upright panels 48 positioned parallelly and spacedly apart. Panels 48 and base 47 are substantially planar in configuration. The carriage structure 38 includes a pair of generally "U"-shaped channels 46 which are positioned on the free ends 49 of the upright panels 48. A pair of upright supports 50 are positioned proximate the upstanding panels 48 and extend almost to the inverted "U"-shaped channels 46.

Positioned pivotedly within the structure of carriage 38 are a pair of pawls: a first pawl, generally 52, and a second pawl, generally 54. Both pawl 52 and pawl 54 are held within the structure of carriage 38 by a respective pivot pin 56. Each pin 56 extends from one panel 48 through a respective pawl and is mounted within the opposing panel 48 to form a generally horizontally positioned rotational axis for the pawl. Each pin 56 facilitates the reciprocation of its pawl in a generally vertical plane. As shown, this axis may be formed by a bolt 58 which is inserted through apertures 60 defined within the panels 48 of carriage 38. The bolt 58 extends through the panel 48 and subsequently through the structure of the support 50. Thereafter, the bolt enters a generally cylindrical channel 62 defined within the structure of the pawl. The bolt 58 exits the pawl, passes through an aperture within the opposing supports 50, as well as the opposing panel 48.

The end of the bolt 58 may be fitted with a plurality of male threads 64. The threads 64 are dimensioned to mechanically cooperate with a nut 66 whereby bolt 58 forms a pivot for the respective pawl. The bolt is held within the structure of member 42 by nut 66.

Figure 6:
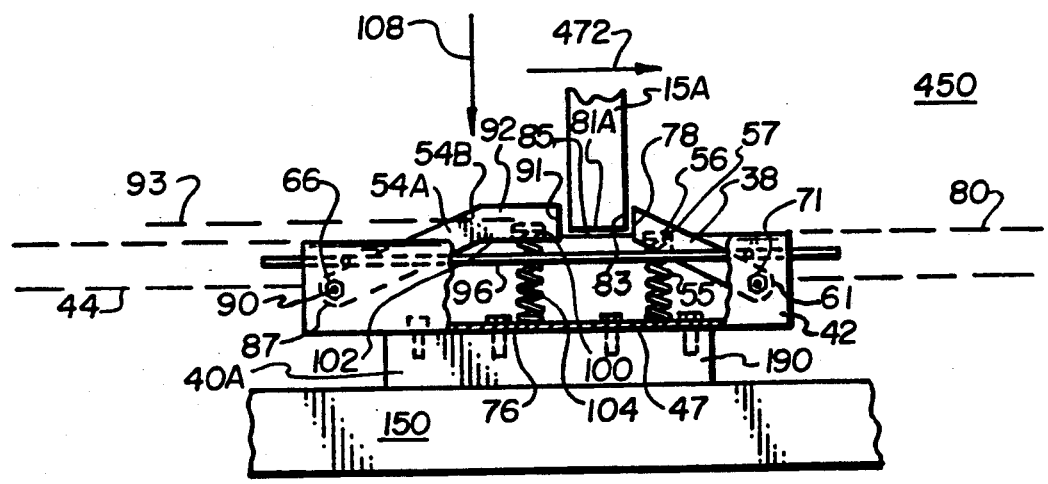
FIG. 6 is a side view of a carriage of the instant invention exposing the interior of that carriage in a cut-away view.

As shown in FIGS. 3 and 6, a coil spring 55 has one end which is mounted upon the base 47 of the carriage 38. The spring 55 extends upright therefrom to be received within the recess well 57 of the pawl 52. Spring 55 is shown in a compressed condition in FIG. 3. In its compressed position (shown in FIG. 6) the spring 55 urges the pawl 52 into a first condition, i.e., a raised orientation. The terminology "first condition," as used herein, should be understood to indicate that the pawl 52 has an abutment surface or face 78 which extends above the uppermost surface level 80 of the carriage 38 sufficiently to engage and retain a filter plate 15. The pawl 52 is also positionable in a second condition or lowered orientation. In this second condition, the abutment surface 78 of the pawl 52 is positioned sufficiently low that it does not engage and retain a filter plate 15. Comparing FIG. 3 with FIG. 6, the pawl 52 in FIG. 6 is in a first condition or raised orientation, whereas the pawl in FIG. 3 is in a second condition or a lowered orientation.

Comparing FIGS. 3–8, pawl 52 is a generally elongate body having a generally quadrilateral cross section. The pawl 52 has a proximal end 61, which is proximate the pivot mounting of the pawl. The distal end 63 includes a generally planar surface abutment face 78. The abutment face 78 is oriented generally transverse to the longitudinal axis 79 of the pawl 52. The pawl 52 includes a smooth planar sliding surface 69. This surface 69 is held in a generally angulated orientation with respect to the longitudinal axis 79 when the pawl is in its first condition. The surface 69 is brought into contact with the handles 81 of the filter plates 15 as the pawl is displaced toward the closed side 450 of the filter press, as indicated by arrow 472. Upon the surface 69 contacting one of those handles 81A, the handle forces the end 63 of the pawl 52 downward, permitting the carriage to continue onward. Once the end 63 clears the handle 81A, the end 63 is forced upward by spring 55 into that space 82 between the adjacent handles 81. In this positioning, the abutment face 78 is in abutment against the side 83 of handle 81A.

Figure 7:
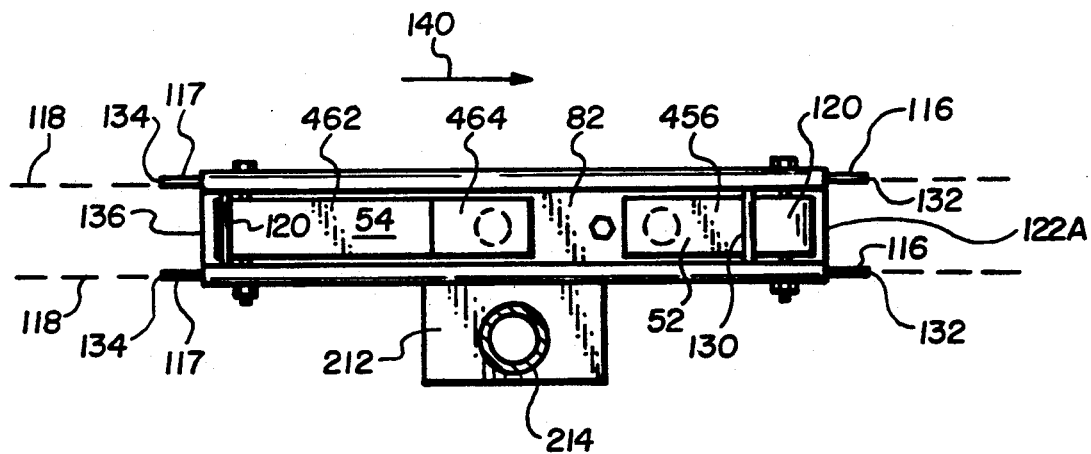
FIG. 7 is a top view of the carriage shown in FIG. 6.

Positioned opposite pawl 52 and spacedly positioned from pawl 52 is a second pawl 54, as shown in FIGS. 3, 6 and 7. Pawl 52 and pawl 54 are positioned apart from one another so as to define an opening therebetween, denoted generally as 85. Pawl 54 is a generally elongate member composed of two definable sections 54A and 54B. Each of these sections is itself an elongate member having a generally quadrilateral cross section. The sections 54A and 54B are conjoined in an angulated orientation, as shown. The proximal end 87 of pawl 54 is proximate the pivot mounting 90 of that pawl. The structure of the pivot mounting 90 is substantially identical to the pivot previously described for pawl 52. The end 91 of the pawl 54 defines a planar surface which functions as an abutment face 92 for pawl 54. The plane of abutment face 92 is oriented substantially perpendicular to a longitudinal axis 93 of the pawl section 54B. Abutment face 92 is positioned opposite abutment face 78 of pawl 52 across opening 85.

As shown by comparing FIGS. 6 and 7, the faces 91 and 78 of pawls 54 and 52 define a generally quadrilaterally cross sectioned space, i.e., opening 85. This space 85 is dimensioned to receive a handle 81 of a filter plate 15 and releasably retain that handle 81. This retention permits the displacement of that filter plate by the abutment of the pawls 52 and 54 against that plate 15.

The pawls 54 and 52 are mounted about the pivots 90 and 71 respectively to rotate in a generally vertical plane i.e., the axis defined by pivots 90 and 71 are each horizontal.

The conjunction of section 54A with section 54B is made at an angle, i.e., section 54A extends in an angulated manner from the section 54B to define a generally obtuse angle therebetween denoted generally 96. The pawl 54 includes a recess well 100 positioned on its lower face 102. Well 100 is dimensioned to receive a coil spring 104. The coil spring 104 is positioned on the base 47 of the carriage 35 and extends upright, i.e., vertically and is received within the recessed well 100.

As shown in FIGS. 3 and 6, the coil spring 104 is constructed to exert a resilient force against the pawl 54 and thereby retain that pawl in an upright first condition or raised orientation. It should be recognized that upon a sufficient force application along a direction indicated by arrow 108, the pawl 54 is depressed downward about its pivot axis. Under sufficient force application, the pawl's distal end 91 may be received within the interior of the carriage 38. In a similar manner to that previously described for pawl 52, pawl 54 may be positioned between one of two conditions. In a first condition or raised orientation, the pawl member 54 extends beyond the uppermost surface 80 of carriage 38. In a second orientation, the pawl 54 is positioned beneath that plane 80, i.e., within the very structure of the carriage 38.

Figure 8:
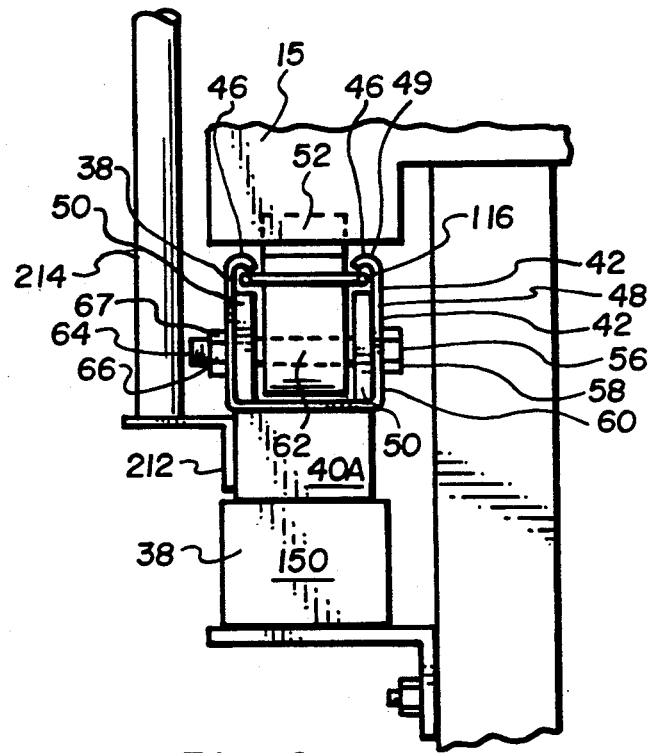
FIG. 8 is an end view of the carriage shown in FIG. 6.

Positioned within the channel 46 of the carriage member 38 is a pair of shaft-like cylindrical members 116. As shown in FIGS. 4, 5 and 8, the members 116 are positioned atop supports 50 and slide along the top surface of those supports. As shown in FIGS. 7 and 8, the cylindrical members 116 each include a longitudinal axis 118. Axes 118 are oriented parallel to the longitudinal axes 20 and 44 of the filter press and carriage, respectively. Shafts 116 are positioned parallel to one another and spacedly apart. Positioned proximate the ends 117 of each shaft member 116 is a cross-member 120 which extends from one shaft member 116 to the oppositely positioned shaft member 116. Each cross-member 120 may also be a cylindrical shaft. As shown, the ends 132 of shaft members 116 extend outwardly from the ends 122 of the carriage member 42. The cross-member 120, which is indicated generally by the notation 130, is positioned in a predetermined relationship with the pawl 52. This relationship is such that upon the ends 132 of the shaft members 116 being inserted into the channels 46 of the carriage member 42 sufficiently so that the ends 132 are substantially flush with the end 122 of the carriage member 38, the cross-member 130 is positioned sufficiently above the pawl 52, as to hold that pawl in its lower orientation, as shown in FIG. 5. In this orientation, the opposing ends 134 of each shaft 116 are extended proportionality outward from the end 136 of the carriage member 42.

An opposing displacement of the shaft members 116, in the direction indicated generally by arrow 140, results in the disengagement of that cross-member 130 thereby permitting the return of the pawl 52 to its raised orientation, as shown in FIG. 4. It will be recognized therefore that the displacement of the shaft member 116 directed toward either end of the carriage end affects a displacement of the cross-members 130 and 120 into either an orientation wherein pawl 52 is depressed or alternately into an orientation wherein the pawl 52 is urged into its uppermost orientation.

As shown in FIGS. 9 and 10, a drive means of the invention may include a fluid pressure cylinder 150 defined by a generally cylindrical tubular sidewall 152. Sidewall 152 defines a hollow interior cavity or channel 154. Sidewall 152 is elongate and extends along a longitudinal axis 160. The sidewall 152 defines a slot-like aperture 156 which extends substantially the entire length of the sidewall 152. The slot 156 includes as its perimeters the edges 158 of the tubular sidewall 152.

The channel 154 shown in FIG. 10 is substantially circular in cross section and is hence cylindrical in configuration. Fitted within the channel 154 is a cylindrically configured piston 162. Piston 162 is dimensioned and configured to be reciprocally slidable within the channel 154. Positioned on each end of the cylinder 162 is a plate 164 respectively designated 164A and 164B. The plate 164 in conjunction with the portion of the interior sidewall 166 which defines channel 154 as well as the end plates 170 define a pair of pressure chambers 172, more specifically, chambers 172A and 172B.

As shown in FIG. 9, each pressure chamber 172 is substantially sealed with the exception for the slot 156 defined by the side wall 152. A sealing strip 174 is provided to be inserted within slot 156 and to form a seal of that slot whereby each pressure chamber 172 is thereby sealed air tight, permitting a pressurization of that chamber. Air supply conduits 180 and 181 each access a respective pressure chamber 172 and provide a means whereby pressurized air may either be introduced into the chamber or alternately withdrawn from the chamber.

The piston 162 is fitted with a means of successively positioning the strip 174 within the slot 156 or alternately removing that strip to facilitate the passage through the slot 156 of a neck-like region of a carriage/piston support mounting 182. The mounting 182 connects the cylindrical piston 162 to the carriage 38. Any displacement of piston 162 results in a corresponding and equal displacement of the carriage 38. The piston fitted tubular member, commonly denominated a "rodless cylinder," is presently available commercially under the trade designation "Lintra" and is marketed by Martonair, Inc. of Agawam, Mass.

A more thorough discussion of the construction of a type of rodless cylinder employable in the instant invention is that made in Lieberman U.S. Pat. No. 4,545,290 The specification of that patent is incorporated herein by reference.

The top of the rodless cylinder may form a guide track 34 upon which the carriage 38 may slide.

As shown to advantage in FIG. 10, the carriage mounting may include a platform 190 having a generally inverted "U"-shaped configuration wherein the arms 194 of that "U"-shaped configuration are fitted with inwardly directed extensions 196. These extensions are configured to be received within "V"-shaped channels 198 configured within the side of the rodless cylinder 150.

The neck 182 of the platform 190 extends downward through slot 156 and is thereafter fitted to the piston 162 through means of the yoke 200. The sealing slide strip 174 is fixedly mounted to the ends 170 of the cylinder and laid within slot 156. The strip is positioned through the opening 202 defined within the yoke 200. As the piston reciprocates within the channel 154 the strip is either positioned within the slot 156 or removed therefrom by the action of the yoke. This permits the passage through slot 156 of the neck 182.

Figure 11:
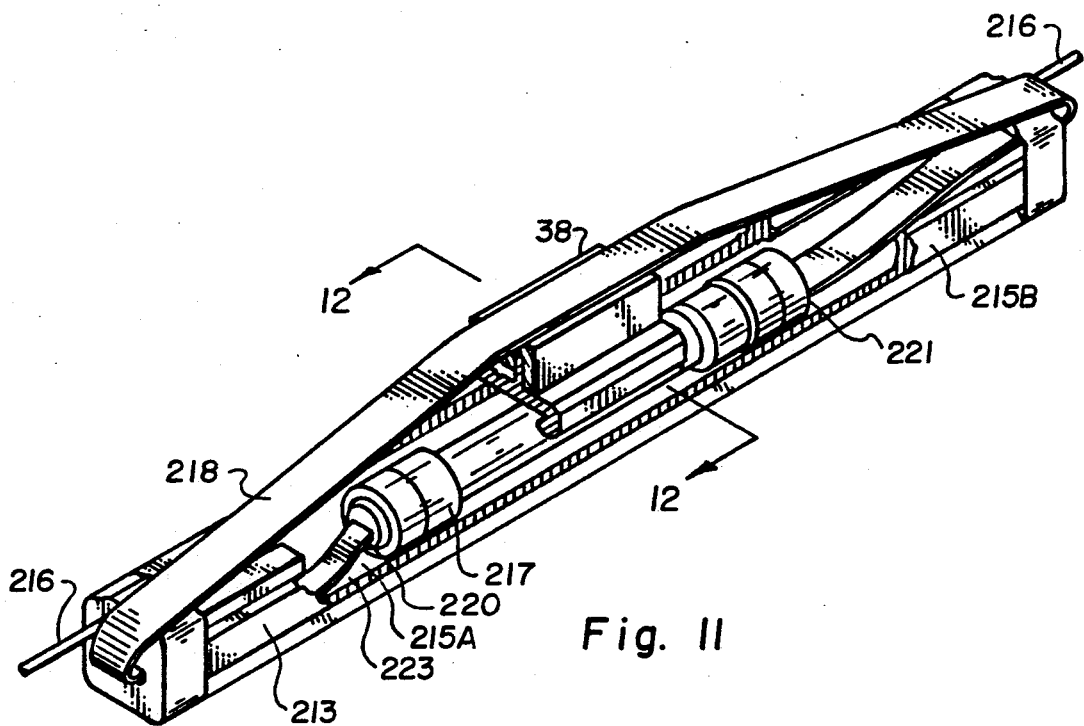
FIG. 11 is an elevated perspective view of a second rodless cylinder drive means of the invention.
Figure 12:
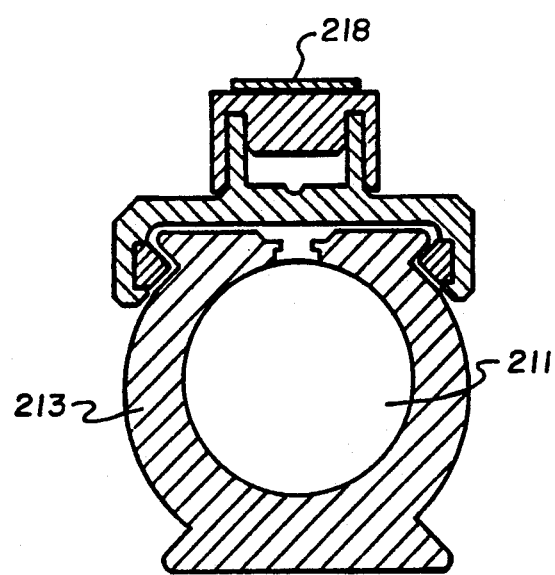
FIG. 12 is an end view of the rodless cylinder shown in FIG. 11.

Alternate constructions of a rodless cylinder for use in the instant invention are disclosed in FIGS. 11 through 14. In FIGS. 11 and 12, an elongate tubular member 213 defines a hollow cylindrical cavity 211 which in turn defines two pressure chambers 215A and 215B. A piston 217 is slidably positioned within the cavity and serves to separate one pressure chamber from the other. The tubular member 213 does not include a slot 156. Each pressure chamber is fitted with an inlet port 216 for either injecting or venting compressed air into the chamber. An elongate flexible band or cord 218 is affixed to the piston 217. A proximal end 220 of the cord is affixed to one end of the piston and a distal end 221 of the cord is affixed to the opposing end of the piston. The cord extends from the piston outward through a respective pressure chamber and thereafter sealedly through an end wall 223 of the tubular member to form in association with the piston 217 an endless member. The carriage 38 is fixedly mounted to the cord such that any displacement of the piston 217 effects a corresponding displacement of the carriage 38.

Figure 13:
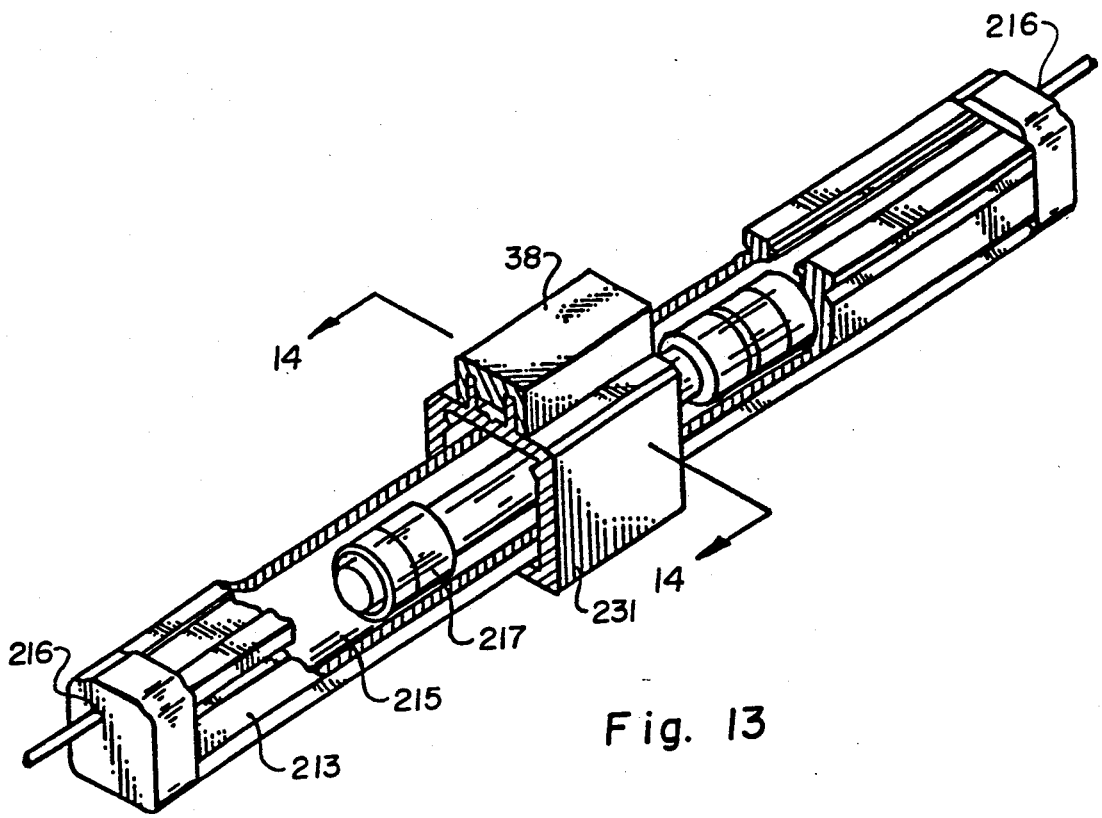
FIG. 13 is an elevated perspective view of a third rodless cylinder drive means of the instant invention.
Figure 14:
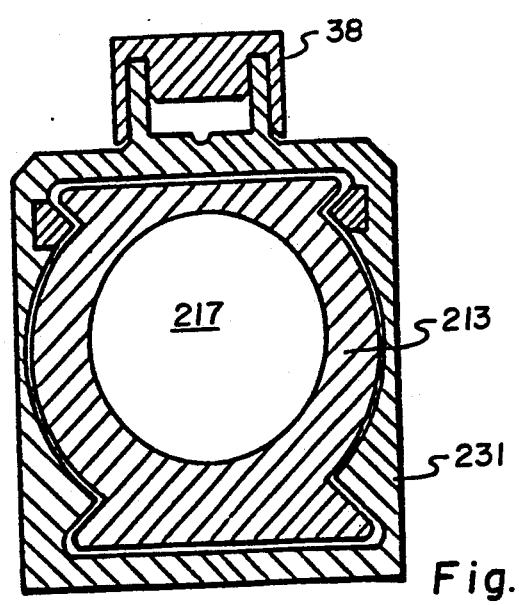
FIG. 14 is an end view of the rodless cylinder shown in FIG. 13.

In FIGS. 13 and 14, the rodless cylinder, shown in FIGS. 11 and 12, is modified to accommodate a third means of associating the carriage 38 with the piston 217. In this construction, the connective function of the band 218 is replaced by the use of a magnetic union of the carriage 38 with the piston 217. There are no inlets into the pressure chambers 215 except for air inlet ports 216. The piston 217 is fabricated from a material having magnetic-type characteristics, e.g., an iron compound. Fitted about the exterior sidewall of the tubular member 213 is a ringlike collar 231. This collar includes an inner aperture which is dimensioned to slidably receive the tubular member 213, i.e., the collar is adapted to slide along the length of the tubular member 213. The collar 231 is likewise fabricated from a material having magnetic characteristics.

As pressurized air is introduced into pressure chambers 215 and the piston is displaced within the tubular member 213, the collar is likewise displaced due to a magnetic force induced union of the collar 231 with the piston 217. As a result, the carriage 38 is reciprocated along the length of the tubular member 213 responsive to the pressurized air induced displacements of the piston 217.

Other rodless cylinders which may be used in the instant invention are those sold commercially under the trade designations "Trans-air System" manufactured by Mosier Industries, Inc. of Brookville, Ohio; "Series 2000" manufactured by Orija Corp. of Elmhurst, Ill.; and "Band Cylinders" manufactured by Tolomatic of Minneapolis, Minn.

Figure 20:
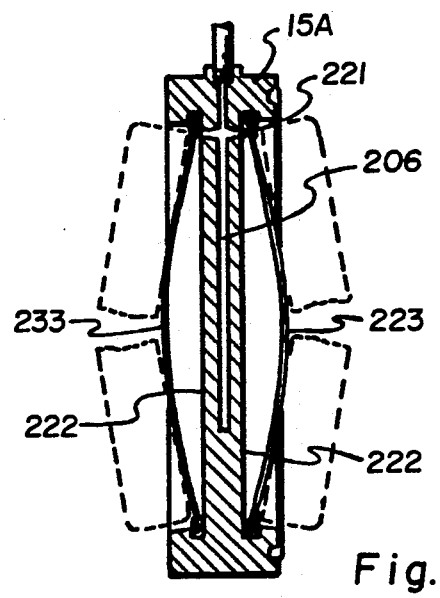
FIG. 20 is a side view of a filter plate.

As shown in FIG. 20, the carriage 38 of this instant invention may, in a preferred embodiment, be fitted with a means of supplying pressurized air to an interior conduit system 206 positioned within a filter plate 15A.

Figure 17:
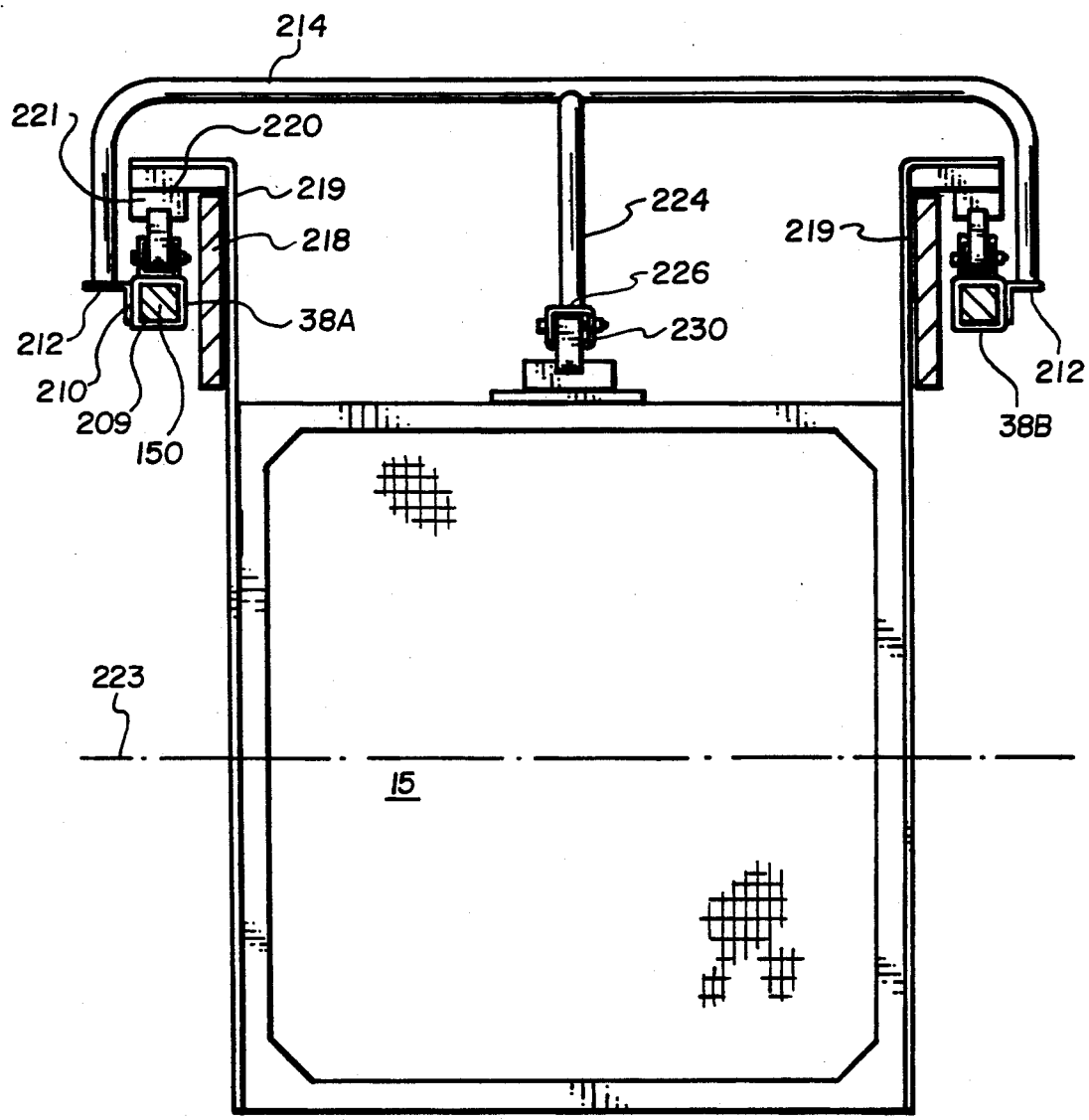
FIG. 17 is a partial elevational view of the filter press illustrating a synchronizing means in association with a stabilizing means.

As shown in FIGS. 15–17, a pair of carriages 38 spacedly mounted apart from one another on opposing sides of a filter press may be physically associated with one another by means of a synchronizing means 208. In this embodiment, the carriage 38 is formed as an elongate hollow tubular member having a generally quadrilateral cross-section. The carriage 38 defines a square cross-sectioned interior channel 209 having opposing open ends. The rodless cylinder 150 is received within the channel 209. Basically, the carriage forms a sleeve which circumscribes the rodless cylinder 150. The carriage 38 is slidable along the length of the cylinder. The size of the channel 209 is dimensioned sufficiently proximate the exterior dimensions of the cylinder as to preclude a rotation of the carriage 38 around the cylinder 150 about the longitudinal axis of the cylinder.

Mounted on the outside upright wall 210 of the carriage 38 is an "L"-shaped mounting bracket 212. A generally inverted "U"-shaped rigid rod 214 is mounted at each of its ends to a respective bracket 212 whereby the rod 214 extends between the two opposing carriages 38A and 38B (see FIG. 17).

The rod 214 is sufficiently rigid that the motion or displacement of one carriage 38 is transmitted to the other carriage through the rod. It follows that as the two carriages 38 proceed along the length of their respective cylinders, their respective displacements are synchronized by the operation of the rod 214. Should one carriage 38 encounter an obstacle, e.g., a sludge deposit which either slows or stops the carriage's forward or backward displacement, the other carriage is also either slowed or stopped. Recognizably, the force being imposed on the carriage which has not encountered the obstacle, by its respective cylinder, will be in part transferred to the obstacle encountering carriage through intermediation of the rod.

The function of rod 214 becomes important when one realizes that a filter press, which utilizes a fluid cylinder as its drive means, relies on a fluid pressure to drive the carriages along their appointed routes. The amount of force being applied by the cylinders is a function of the drag resistance being encountered by the carriages. As a result, when a carriage encounters an obstacle, the cylinder must build up a sufficient fluid pressure to apply a force of a magnitude to overcome that force. The delay associated with building up that fluid pressure may lead to the opposing carriage advancing beyond the encumbered carriage and thereby misaligning the filter plate being driven jointly by the two carriages. Mechanical drive systems such as those utilizing sprocket driven chains conventionally apply a constant drive force uniformly to both of the opposing carriages. The force applied is typically of a magnitude sufficient to overcome any resistance encountered by a traveling carriage. Furthermore, the two chain drives typically are connected to a common power source, e.g. a motor. Therefore, in the event that one of the carriages encounters an obstacle which offers sufficient resistance that the speed of the carriage is effected, the decrease in carriage and hence chain speed is communicated directly to the driven motor. The drive motor then simultaneously effects a corresponding decrease in carriage speed to the non-obstacle encountering carriage. Thus no misalignment of the filter plates occurs.

In contrast, the instant invention in utilizing a pair of drive means, i.e. pressure fluid cylinders, introduces the possibility of misalignment occurring in that a single drive source cannot be relied upon to synchronize the displacement of the two carriages.

Figure 19:
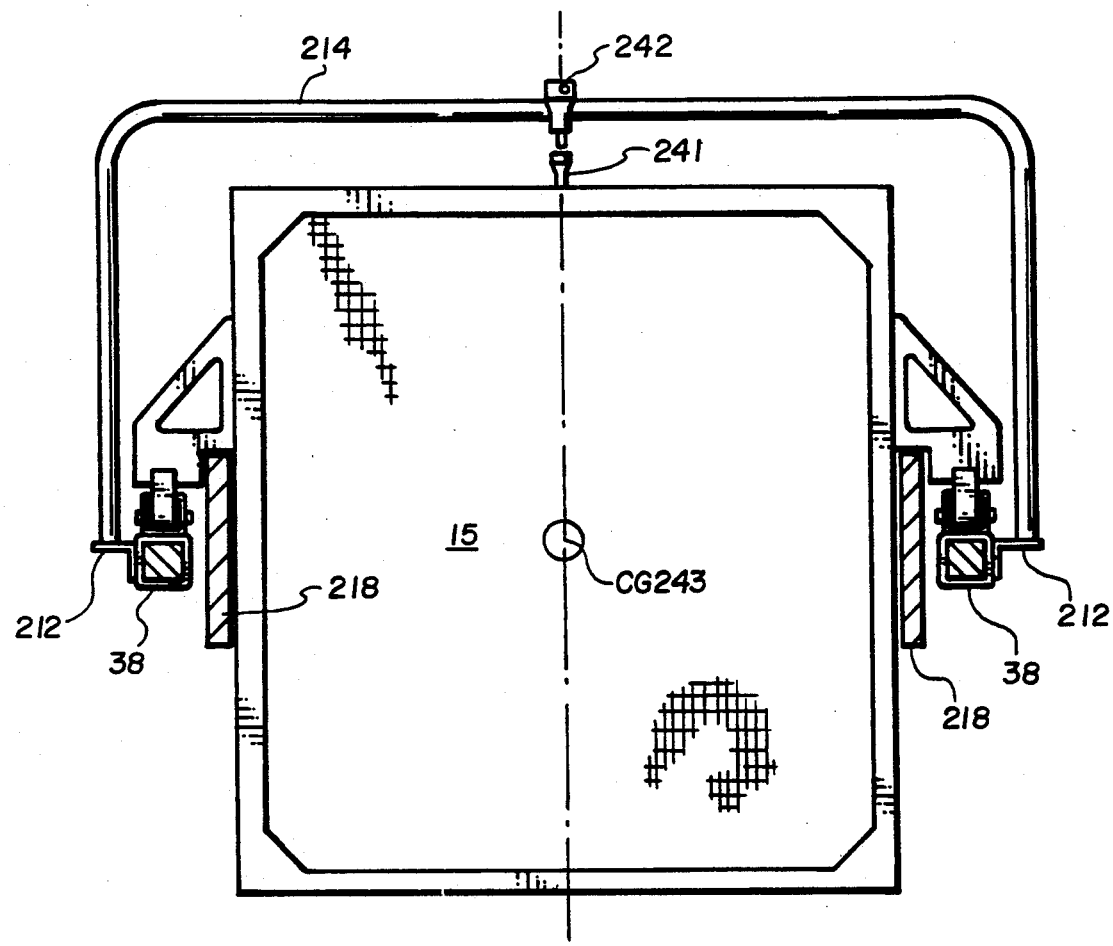
FIG. 19 is a partial elevational view of a filter press illustrating an air introduction means.

In the embodiment shown in FIG. 15, the carriages 38 are shown mounted proximate the upper region of the filter plates 15 being moved. As shown to advantage, in FIG. 17, an inverted "L"-shaped mounting bracket 219 is mounted on each of the upright sides 218 of the plate 15. Each of the brackets 219 ride atop an elongate, longitudinally extending guide rail 218. Each bracket 219 is mounted with a handle 220 which is fabricated of a material having a low coefficient of friction such that the sliding displacement of the bracket along the rail 218 is not unduly hindered. The handle 220 includes an extending finger 221 dimensioned to be received within the space defined by the opposing pawls 52 and 54. Recognizably, the handle 220 could be mounted on the upright sides of the filter plate 15. In this latter construction, the rod 214 is simply extended in length so as to extend the alternate carriage location. This alternative carriage location is shown in FIG. 19.

The rod 214 may also be fitted with a means of stabilizing the transported filter plate 15, especially against angular rotation about a lateral axis 223. Recognizably, due to the need for spacing between the opposing pawls 52 and 54 of each carriage, the handles 220 are not securely grasped by those pawls. As a result, the plate 15 may tend to rock as it is transported along the press by the displacing carriage 38. As shown to advantage in FIGS. 15-17, a vertically extending bar 224 is mounted on rod 214 proximately midway along the laterally extending portion of that rod 214. The bar 224 extends downwardly from the rod 214 to a location proximate the top of a filter plate 15 being transported. Mounted on the free end 226 of bar 224 is a carriage 230. As shown in FIGS. 15 and 26, carriage 230 is structurally identical to the carriage assembly 42 shown in FIG. 2. Two pawls 232 and 234 are pivotedly mounted in the carriage 230 by means of respective laterally extending pivot bolts 236 and 238. Each of the pawls is formed on its downward facing surface with an exterior configuration adapted to function similarly to the corresponding surfaces 462, 464 and 456 of pawls 52 and 54 a previously described.

The filter plate 15 is fitted on its top edge with a handle 239 which extends vertically upward. The handle 239 is dimensioned to be received in the space defined between the opposing pawls 232 and 234. The handles 239 of adjacently positioned filter plates 15 are configured to provide the same camming action as the pawls 232 and 234 as previously described for the carriages 42. In preferred constructions, the handle 239 is mounted midway between the opposing upright sidewalls 240 of the filter plate 15. Preferably, the handle 239 is mounted directly above the center of gravity of the filter plate 15. Understandably, the instantly described stabilizing means may be positioned to engage the filter plate at locations other than on the top edge of the filter plate approximately midway between the upstanding sides of the plate.

Recognizably, the invention may include any arrangement wherein the carriage/synchronization bar structure is mechanically connected to the filter plate at three separate and distinct locations which are not collinear in orientation. For example, two connection points may be along a single upright side of the filter plate while the third is along an opposing upright side. In these alternative constructions, the support bar of the stabilizing means extends from the rigid bar 214 to a point proximate the filter plate. The carriage 38 and filter plate handle are structurally identical to those previously described.

Figure 18:
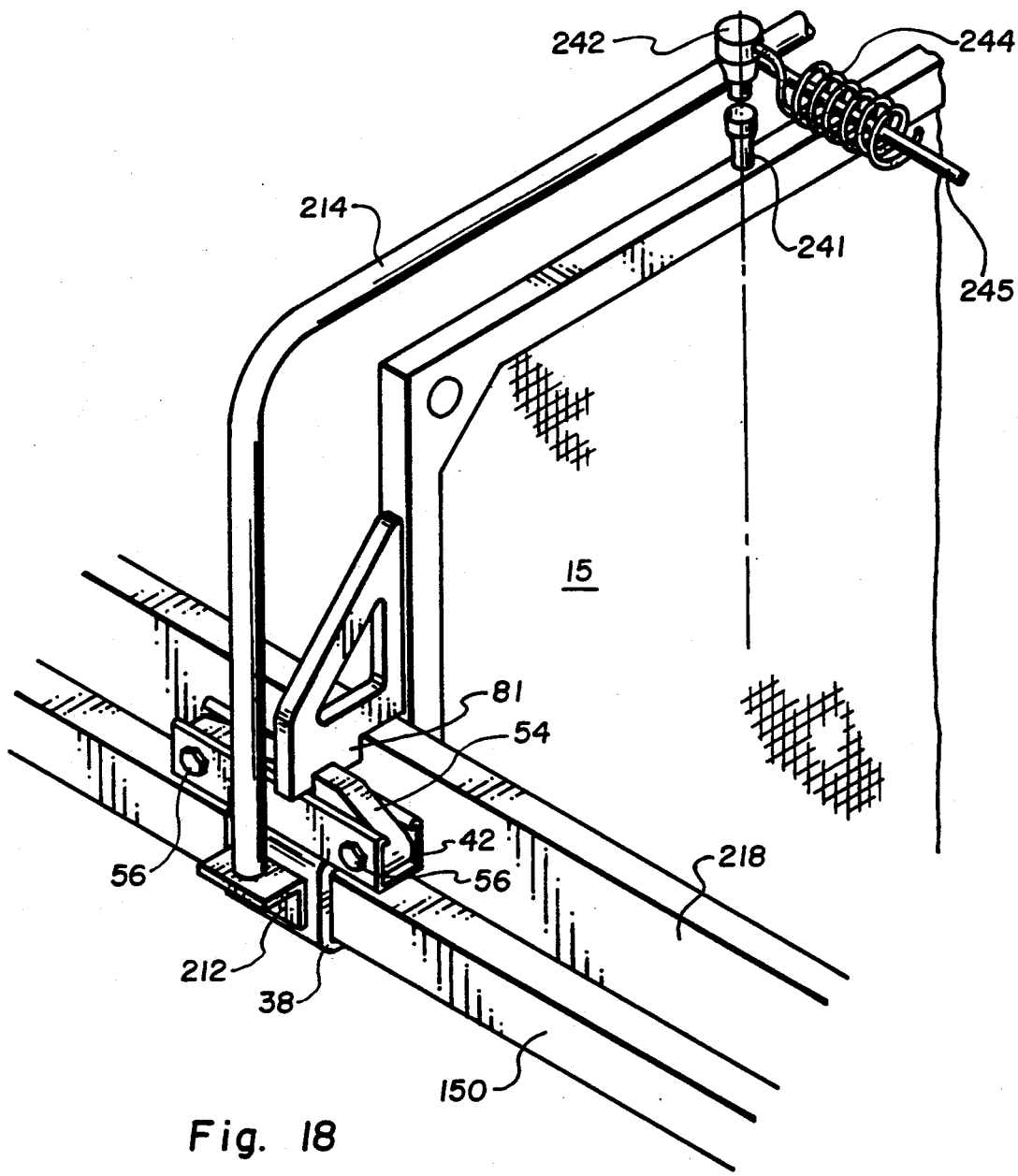
FIG. 18 is a partial perspective view of a synchronizing means of the invention fitted with an air introduction means.

The invention also includes a means of introducing pressurized air to a system of conduits defined within the frame of the filter plate itself. A filter plate of a type amenable to pressurized air introduction is shown in FIG. 18. Whereas applicant's previous disclosure illustrated an air introduction means wherein the air was input into the plate by means of a carriage carried nozzle which interacted with the laterally extending handles of the plates, the present invention contemplates the introduction of air through a bayonet-type nozzle assembly 242 which is mounted on the rod 216. Nozzle assembly 242 is of a conventional pressurized bayonet-type air injection nozzle which, upon the application thereto of a quantity of pressurized, air, an air conveying conduit extends outwardly into a sealed engagement with an inlet port mounted on the plate 15. As shown in FIGS. 18 and 19, the nozzle 242 is mounted to be positioned vertically above the center of gravity 243 of plate 15 and along the vertical axis of the plate 15. Nozzle 243 is supplied by pressurized air by a flexible conduit 244 which is connected to a source of pressurized air (not shown). The conduit 244 is supported by a longitudinally extending rod 245 which may be of a telescopic construction whereby the rod 245 may extend and retract with the nozzle's displacement along the press. As shown in FIG. 1, the rod may extend from the closed region 450 of the press. Alternatively, the rod 245 may extend from the open section 452 of the press. The rod 245 is generally supported by a frame or other support structure of the press. In one embodiment, the rod 245 may be replaced by a flexible cable which similarly supports the flexible air hose 244.

Figure 21:
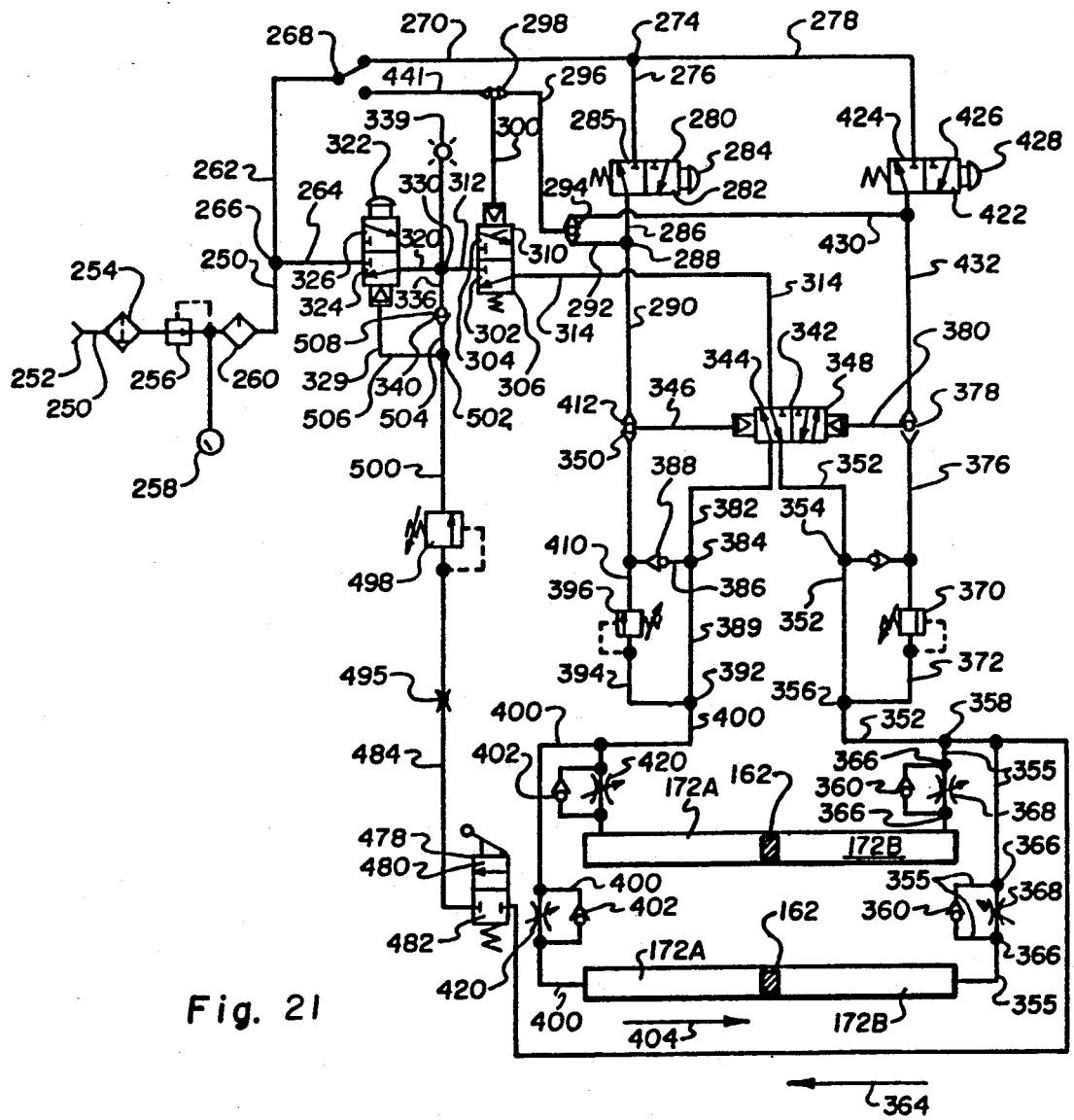
FIG. 21 is a schematic view of a flow diagram of the invention.

The flow logic of the plate shifter control system is shown schematically in FIG. 21. For purposes of clarity, the following description will utilize pressurized air as the activation medium. It should be understood that any pressurized fluid may be used, i.e., the system may be either pneumatically or hydraulically actuated. As illustrated, pressurized air is injected into a conduit 250 by means of port 252. The air passes through a filter 254 and a pressure regulating valve 256. A gauge 258 is connected to valve 256 and functions to monitor the pressure of the air flow in conduit 250. The air then passes through a lubricator 260.

Conduit 250 branches into two conduits 262 and 264 at Tee connection joint 266. Conduit 262 is fitted with a switch 268, which is preferably manually operated. The two way switch 268 functions to switch the system from a manually operated system to an automated system and vice versa.

In the manual mode, conduit 262 is interconnected to conduit 270 by switch 268. Air flows through conduit 270 eventually reaching a Tee connection 274. At Tee 274, conduit 270 branches into two conduits 276 and 278. Conduit 276 leads to a pendant two-way valve 280. Valve 280 is a manually operated, spring return valve having two orientations. The two orientations are depicted in the square box-like outlines 282 and 285. The valve orientation, shown in box 282 and illustrated proximate the manual button 284, is the orientation effected by depressing button 284. The orientation shown in box 285 is that obtained by the spring return, i.e., the orientation in box 285 depicts the equilibrium position of the valve 280.

As the button 284 is depressed, valve orientation 282 permits air flow from conduit 276 through valve 280 and into connected conduit 286. When the valve 280 is in its equilibrium position, flow of air from conduit 276 through valve 280 is precluded.

Air entering conduit 286 is directed by Tee connection 288 into conduits 290 and 292. The air flowing in conduit 292 is directed by spindle valve 294 into conduit 296. Spindle valve 298, which is fitted to conduit 296, directs the air from conduit 296 into conduit 300. The air in conduit 300 is directed to a pressure operated two position valve 302. The pressure of the air in conduit 300 shifts valve 302 into an open orientation depicted in box outline 304. When the valve 302 is not pressurized by air in conduit 300, a spring returns the valve 302 to its equilibrium position as depicted in box outline 306. In the valve orientation depicted by outline 304, conduit 310 is connected to a conduit 312 and a conduit 314 thereby permitting flow between those two conduits.

The pressurized air within conduit 300 does not pass through valve 302, but instead serves to retain the valve 302 in its actuated orientation, i.e., the orientation indicated by box outline 304. When valve 280 is returned to its equilibrium position, i.e., the orientation indicated at 285, the air in conduit 300 is vented to the atmosphere through the flow path defined by conduit 296, conduit 292, conduit 286 and valve 280.

Valve 302, in the orientation illustrated by box 306, precludes the passage of pressurized air from conduit 312 to conduit 314.

Conduit 312, in conjunction with conduits 264, 320 and 314, defines an air drive line. These conduits channel that portion of the pressurized air which moves the drive piston 162.

Positioned between conduits 264 and 320 is a two position manual valve 322. Valve 322 is pressure returned to the equilibrium orientation, depicted by box outline 324, by air pressure channeled through conduit 329. In the orientation illustrated in box outline 324, air flow from conduit 320 is vented to the atmosphere.

In the orientation depicted by box outline 326, pressurized air from conduit 264 is directed into conduits 320 and 312. As air flows through the four-way connection joint 330, which connects conduit 320 with conduit 312, air likewise flows into conduit 332.

Conduit 332 is fitted with a pneumatically actuated indicator 334. Indicator 334 is adapted to provide a visual indication of the presence of air in the system.

Pressurized air, which is received from joint 330 and which flows into conduit 336, is precluded from further flow through that conduit by check valve 340.

With valve 322 in the orientation shown by box outline 326, and valve 302 in orientation illustrated in box outline 304, pressurized air may be received from port 252 and channeled to conduit 314. The air from conduit 314 is directed to a two-way pressure activated valve 342.

As shown, valve 342 is positioned in a first orientation shown in box 344 by air pressure within conduit 346. That pressure is engendered when the valve 280 has been manually activated, i.e., to an orientation shown by box outline 284, and pressurized air flows into conduit 290 and is directed into conduit 246 by spindle valve 350. In the orientation shown in box 344, valve 342 directs air from conduit 314 to conduit 352. Pressurized air flows through conduit 352, past Tee connection joint 354, and Tee connection joint 356 to Tee connection joint 358. Tee connection joint 358 connects conduit 352 to conduit 355. The pressurized air flowing in conduit 355 is directed past check valve 360 into a sealed pressure chamber 172B. The increase of air pressure within chamber 172B operates to displace piston 162 due to the force acting on piston head 164B. Piston 162 is displaced in the direction indicated by arrow 364.

Positioned between the two connection units 366, which are placed within conduit 355, is a needle valve/pressure regulator 368. Valve 368 is adapted to control the outward flow of air from the chamber 172B to the conduit 352.

In those embodiments wherein two pressure cylinders are used, i.e., one on each side of the filter plate array, a needle valve 368 is positioned within each feed conduit 355 of a respective pressure chamber 172B thereby permitting the synchronization of those pressure cylinders by controlling the discharge of air from the pressure chambers 172B.

All air discharged from the chamber 172B is routed through valve 368 since check valve 369 precludes a passage of discharged air through conduit 355.

Tee connection 356 directs air from conduit 352 to a pressure regulating valve 360. Valve 370 is adjusted to permit a passage of air therethrough upon air pressure in conduit 372 reaching a selected level.

Operationally, the disparity in pressure between pressure chambers 154A and 154B causes the piston 162 to displace carriage 38. Since that carriage 38 abuts against a filter plate 15A, the plate is also displaced. Once filter plate 15A is precluded from further movement in the direction of the moving carriage, the motion of the carriage and piston is precluded. Since the piston is precluded from further forward movement the air pressure in conduit 352 builds. When that pressure reaches the level necessary to activate valve 370, the air from conduit 352 is directed from conduit 352, into conduit 372, through valve 370, and into conduit 376. Check valve 378 channels the air from conduit 376 into conduit 380. The pressure of the air in conduit 380, soon exceeds the pressure of the air in conduit 346 and thereby displaces valve 342 into the orientation identified by the outline 348. The valve orientation as indicated by outline 348 directs the flow of pressurized air from conduit 314 into conduit 382 while it simultaneously vents the air contained within the conduit 352.

Pressurized air in conduit 382 is directed to Tee connection joint 384. Flow into conduit 386, which conduit extends from that joint 384, is precluded by check valve 388. Resultingly, the pressure air is channeled into conduit 389.

Conduit 389 directs the air flow to Tee connection joint 392. Flow into conduit 394, which extends from joint 392, is precluded by pressure regulating valve 396, until the pressure in conduit 394 exceeds a selected value. When the air flow in conduit 389 is below the selected pressure valve, the air flow is directed through conduit 400, past check valve 402 into the pressure chamber 172A. As the pressure increases within chamber 172A, the piston 162 is displaced in the direction indicated by arrow 404.

As the carriage 42 abuts against a filter plate which is precluded from further displacement in the direction indicated by arrow 404, the piston's displacement is likewise precluded. The continued addition of pressurized air into the system, specifically in pressure chamber 172A, results in the pressure within the conduit 394 increasing to the selected pressure value of valve 396. Resultingly, the valve 396 is opened, permitting air flow from conduit 394 into conduit 410. The air in conduit 410 is directed by spindle valve 412 into conduit 346. As the air pressure in conduit 346 increases it eventually overcomes the pressure in conduit 380 and thereby valve 342 is shifted by that air pressure into the orientation depicted by box outline 344. This valve shift directs air flow into channel 352.

The pressurized air within chamber 172A may be discharged from that chamber by passage through needle regulatory valve 420. Discharge flow through conduit 400 is precluded by check valve 402. The discharged air is directed through conduit 400, conduit 389, and conduit 382 eventually being vented to atmosphere through valve 342.

A counterpart valve 422 to valve 280 is connected to conduit 278. Valve 422 is a two-position, manually operated valve positionable between two orientations identified by box outlines 424 and 426. The valve 422, in its spring biased, equilibrium position 424, precludes air flow through the valve. The orientation 426 which is obtained by manually depressing button 428 defines a flow channel from conduit 278 into conduit 430. Air flow within conduit 430 is directed into conduit 296 by spindle valve 294. Valve 422 also channels air flow along conduit 432 to spindle valve 378 and thereafter into conduit 380. This air flow in conduit 380 effects a shift in valve 342 to the orientation designated by box outline 348.

Resultingly, air received into conduit 324 by the activation of valve 302 and 324 is directed through valve 342 into conduit 382. From conduit 382 it follows the flow path as heretofore described.

In its manual operation mode, the system permits a user to alternate the displacement of piston 162 at will by depressing buttons 284 and 428.

The automated system is engaged by positioning switch 268 to direct pressurized air flow into conduit 441. The air flows into conduit 300 from conduit 441 after being directed by spindle valve 298. The air flow thereby shifts valve 382 into the orientation denoted by box outline 304. This orientation permits an air flow from conduit 250, through conduits 264, 320 and 312 into conduit 314, given the positioning of valve 322 in its orientation denoted by box outline 304.

The air flow enters valve 342 and is channeled thereby into either conduit 382 or conduit 352 depending on the particular orientation of the valve 342 prior to the initiation of the system's operation. The following description will assume that flow was into conduit 382.

As air flows through conduit 382, it effects the displacement of the pistons 162 in the direction indicated by arrow 404. Upon the pistons' forward progress being arrested by the carriages 42 abutting against a filter plate 15, the accompanying increase of air pressure within the pressure chamber 172A exceeds the preselected level of valve 396 causing the bypassing of that valve. Thereafter, the pressurized air flow is directed against valve 342 to shift that valve to the orientation identified by box outline 344. The air flow from conduit 314 is thereafter directed to conduit 352. The air flow forces a displacement of pistons 162 in the direction indicated by arrow 364. Upon the carriages 42 abutting against an oppositely positioned filter plate 15 the pistons' progress is again arrested. As pressure continues to build in pressure chamber 172B, the pressure level of valve 370 is exceeded causing the bypassing of that valve. Thereafter, air flow is directed past valve 370 into conduit 376. Spindle valve 378 directs the flow into conduit 380. The air in conduit 380 acts on the pneumatically manipulated valve 342 to shift it into the orientation denoted by box outline 348.

This shifting from the valve 342 between the orientations identified by box outlines 344 and 348 continues as the carriage is driven between the open array 452 of filter plates and the closed array 450 of filter plates.

Upon the last filter plate from the closed array side 450 of the filter press being transferred to the open side 452 of the frame, the last trip of the carriage 42 along the guide track 39 toward the closed side 450 results in the carriage impacting against the stop 454. More specifically, the ends 132 of the side members 116 impact against the stop 454.

The slide members 116 are slidably mounted in the channels 46 of carriage 42. Resultingly, the ends 132 are driven toward the end 122A of each respective carriage 42, until the ends 132 are flush with the surface 122A. This results in the cross-members 130 being pushed along the surfaces 453 of each pawl 52. The cross-member 130 forces each pawl 52 into its lower orientation as shown in FIGS. 3 and 5. This shifting of each pawl 52 into its lower orientation results in the compression of spring 74.

Since the forward progress of carriages 42 is arrested due to their abutment against stops 454, the flow circuitry reverses the direction of the pistons 162 and carriages upon sufficient pressure being generated within the conduit proximate the pressure regulated valve, i.e., valve 370 or valve 396.

As the carriages 42 are driven toward the open side 452, the edges 460 of the filter plates 15 impact against surfaces 462 and 464 of sections 94 and 92 of each pawl 54. Due to the angled orientation of surface 462 and the resilient spring support of each pawl 54, the filter plate edges slide along the surface 462 and thereafter along surface 464. Each pawl 54 is depressed by the filter plate edges against the action of its respective spring 107. Each pawl 54 does not catch against the filter plates 15 on the open side 452, nor do the filter plates substantially arrest the progress of the respective carriage 42, as the carriage 42 moves in the direction indicated by arrow 364 until it impacts against a filter plate 15 positioned on the closed side 450 of the frame.

Each abutment face or surface 78 is depressed below the upper surface 80 of the carriage 42 by the cross-member 130 sufficiently that it also does not catch the edges of the filter plates as the carriage passes below those edges 460.

Upon each carriage 42 reaching the end of its guide track 34, it impacts against a stop 470. The impact forces slide members 116 in the direction indicated by arrow 472. The impact forces the slide members into each carriage until ends 134 of those slide members are flush with surface 122B of each carriage 42. This displacement of the slide members is sufficient to remove each cross-member 130 from its depressing engagement against a respective pawl 52. As a result, the pawl 52 of each carriage 42, due to the action of a respective spring 104, returns to the raised orientation shown in FIG. 4.

Positioned proximate each stop 470 is a disengagement button 476 which is connected to a regulatory valve 478. Upon carriage 42's impact against stop 470, the carriage 42 likewise impacts against button 476 thereby engaging said button. Valve 478 has two positions. One position is activated by the depression of button 476. Upon release of the depressing force, a spring returns the valve to its equilibrium position. The depressed valve orientation is shown in FIG. 13 in box outline 482. The equilibrium orientation is shown in box outline 480. As shown, the equilibrium orientation precludes air flow through the conduit 484. The orientation shown in box outline 482 permits flow from conduit 484 into conduit 492.

Conduit 492 includes a flow restrictor 495. Conduit 492 is connected to a pressure sensitive regulator valve 498 similar to those identified as 370 and 396. Upon the air pressure in conduit 492 reaching a specified level, the air flow bypasses valve 498 and enters conduit 500. As the flow in conduit 500 enters Tee connection joint 502, the flow is directed into conduit 506. As the pressure builds in conduit 506, the pressure actuated valve 332 is shifted to the orientation indicated in box outline 324. This valve shift interrupts the supply of pressurized driving air to the system.

Any air in conduit 504 is directed through check valve 508. It thereafter is directed through connection joint 330 and conduit 320. It is thereafter vented to the atmosphere through valve 322.

When the system is reactivated, the carriage is moved away from button 476 which then shifts valve 478 to its equilibrium position.

Those skilled in the art will recognize that the embodiments herein and discussed are illustrative of the general principles of the invention. The embodiments herein described are not intended to limit the scope of the claims which themselves recite what applicant regards as his invention.

What is claimed is:

1. A filter press comprising:
   a frame, having opposing sides;
   a press head mounted on said frame;
   a follower displaceably mounted on said frame spacedly from said press head;
   a plurality of filter plates mounted on said frame between said press head and said follower, each said filter plate being displaceable along said frame;
   two rodless cylinders mounted on said frame, said rodless cylinders being mounted on said opposing sides of said frame spacedly apart from another;
   two connection means, each said connection means being displaceably mounted on a respective said rodless cylinder, for engaging an individual said filter plate and forming a releasable union therewith; and
   synchronizing means mounted on each of said connection means and extending therebetween, said synchronizing means operating to maintain said two connection means in a substantially fixed spatial relationship with respect to each other as said two connection means are displaced along a length of said frame;
   wherein an introduction of pressurized fluid into said rodless cylinders effects a displacement of said two connection means along said frame, thereby displacing a said filter plate, engaged by said two connection means, along said frame.

2. The filter press of claim 1 wherein said synchronizing means is a rigid connection bar mounted to each of said connection means and extending therebetween.

3. The filter press of claim 1 wherein each said rodless cylinder includes:
   an elongate tubular member defining a pair of spatially expandable pressure chambers therein, said spatially expandable pressure chambers including means of introducing pressurized fluid into said spatially expandable pressure chambers and venting said fluid from said spatially expandable pressure chambers; and
   a piston slidably mounted within said elongate tubular member between said spatially expandable pressure chambers, a spatial expansion of one of said spatially expandable pressure chamber causing a spatial displacement of said piston within said elongate tubular member.

4. The filter press of claim 3 further including two carriages, each said carriage being mounted on said elongate tubular member, each said carriage being associated with a respective said piston wherein a displacement of each said piston effects a corresponding displacement of its respective said carriage, each said carriage being connected to a respective said connection means.

5. The filter press of claim 4 wherein each of said connection means includes at least one pawl pivotedly mounted on said carriage adapted for engaging and forming a releasable union with a said filter plate.

6. A filter press comprising:
   a frame;
   a press head mounted on said frame;
   a follower displaceable mounted on said frame spacedly from said press head;
   a plurality of filter plates mounted on said frame between said press head and said follower, said filter plates being displaceable along said frame;
   two rodless cylinders mounted on said frame;
   connection means displacedly mounted on said rodless cylinders for engaging an individual filter plate and forming a releasable union therewith;
   stabilizing means, mounted on said connection means, for engaging an individual filter plate being displaced by said connection means and retarding, if not precluding, an angular rotation of said individual filter plate about an axis-oriented transverse to a direction of travel of said individual plate;
   wherein an introduction of pressurized fluid into said rodless cylinders effects a displacement of said connection means along said frame, thereby displacing a filter plate, engaged by said connection means, along said frame.

7. The filter press of claim 6 wherein said stabilizing means is mechanically associated with said connection means.

8. The filter press of claim 7 wherein said stabilizing means comprises:
   a rigid bar, mounted on said connection means; and
   an engagement means, mounted on said bar, for engaging and forming a releasable union with an individual filter plate.

9. The filter press of claim 8 wherein said engagement means is adapted to engage and form a union with said filter plate at a location vertically above said filter plate's center of gravity.

10. The filter press of claim 8 wherein said engagement means is adapted to engage and form a union with said filter plate on a laterally extending side thereof.

11. The filter press of claim 8 wherein said engagement means includes:
   a support frame; and
   at least one pawl pivotedly mounted to said support frame adapted for engaging and forming a releasable union with one of said filter plates.

12. A filter press comprising:
   a frame;
   a press head mounted on said frame;
   a follower displaceably mounted on said frame spacedly from said press head;
   a plurality of filter plates mounted on said frame between said press head and said follower, said filter plates being displacedly mounted along said frame;
   two rodless cylinders mounted on said frame;
   connection means displacedly mounted on said rodless cylinders for engaging an individual filter plate of said plurality of filter plates and forming a releasable union therewith; and
   an air introduction means for introducing pressurized air into said individual filter plate, said air introduction means being mounted on said connection means to engage an inlet port mounted on a top of said individual filter plate.

13. The filter press of claim 12 wherein said air introduction means comprises:
   a rigid bar mounted on said connection means; and
   a bayonet-type nozzle mounted on said bar adapted for engaging said inlet port of said individual plate.

14. The filter press of claim 13 wherein said inlet port is positioned substantially vertically above said individual filter plate's center of gravity.

15. The filter press of claim 13 wherein said press includes two rodless cylinders are spacedly mounted apart from one another, each rodless cylinder having a respective connection means mounted thereon, said rigid bar being mounted to each of said connection means and extending therebetween.

* * * * *